(12) United States Patent
Liu et al.

(10) Patent No.: US 11,900,965 B2
(45) Date of Patent: Feb. 13, 2024

(54) Z-HEIGHT CONTROL FOR DISC DRIVE USING SERVO WEDGE TIMING

(71) Applicant: Seagate Technology LLC, Fremont, CA (US)

(72) Inventors: Xiong Liu, Singapore (CN); Choon Kiat Lim, Singapore (CN); June Christian Ang, Singapore (CN); Yichao Ma, Singapore (CN)

(73) Assignee: Seagate Technology LLC, Fremont, CA (US)

( * ) Notice: Subject to any disclaimer, the term of this patent is extended or adjusted under 35 U.S.C. 154(b) by 101 days.

(21) Appl. No.: 17/670,627

(22) Filed: Feb. 14, 2022

(65) Prior Publication Data

US 2023/0260547 A1 Aug. 17, 2023

(51) Int. Cl.
*G11B 21/24* (2006.01)

(52) U.S. Cl.
CPC .................. *G11B 21/24* (2013.01)

(58) Field of Classification Search
None
See application file for complete search history.

(56) References Cited

U.S. PATENT DOCUMENTS

| | | | |
|---|---|---|---|
| 4,414,589 A | 11/1983 | Oliver et al. | |
| 5,459,921 A | 10/1995 | Hudson et al. | |
| 5,901,010 A * | 5/1999 | Glover | G11B 20/20 360/78.12 |
| 6,229,677 B1 | 5/2001 | Hudson et al. | |
| 6,307,719 B1 | 10/2001 | Mallary | |
| 6,480,361 B1 | 11/2002 | Patterson | |
| 6,501,606 B2 | 12/2002 | Boutaghou et al. | |
| 6,687,073 B1 * | 2/2004 | Kupferman | G11B 5/59655 360/75 |
| 6,717,776 B2 | 4/2004 | Boutaghou | |
| 6,747,848 B2 | 6/2004 | Kasajima et al. | |
| 6,765,744 B2 | 7/2004 | Gomez et al. | |

(Continued)

OTHER PUBLICATIONS

U.S. Appl. No. 16/863,287, filed Apr. 30, 2020, entitled "Split Ramp for Data Storage Devices", 22 pages.

(Continued)

*Primary Examiner* — Peter Vincent Agustin
(74) *Attorney, Agent, or Firm* — Westman, Champlin & Koehler, P.A.

(57) ABSTRACT

A data storage device includes a disc, an actuator arm assembly, a servo clock, and a feedback and control system. The disc includes a top and bottom surfaces and a servo wedge. The servo wedge includes a top surface boundary and a bottom surface boundary. The actuator arm assembly supports a head pair configured for interaction with the top and bottom surfaces. The servo clock is configured to determine a top time at which the head pair encounters the top surface boundary and a bottom time at which the head pair encounters the bottom surface boundary during a disc read/write interaction. The feedback and control system is configured to determine an operation time difference; compare the operation time difference to a certification time difference correlating to a target vertical position of the actuator arm assembly relative to the disc; and move the actuator arm assembly to the target vertical position.

20 Claims, 11 Drawing Sheets

(56) References Cited

U.S. PATENT DOCUMENTS

| | | | |
|---|---|---|---|
| 6,885,513 B1* | 4/2005 | Baker | G11B 5/865 360/17 |
| 6,952,322 B1* | 10/2005 | Codilian | G11B 5/5582 360/75 |
| 7,180,692 B1 | 2/2007 | Che et al. | |
| 7,212,374 B1* | 5/2007 | Wang | G11B 5/5534 360/78.04 |
| 7,215,495 B1 | 5/2007 | Che et al. | |
| 7,280,305 B2 | 10/2007 | Kwon et al. | |
| 7,292,401 B2 | 11/2007 | Shen et al. | |
| 7,315,436 B1 | 1/2008 | Sanchez | |
| 7,468,856 B2 | 12/2008 | Fitzpatrick et al. | |
| 7,505,860 B2 | 3/2009 | Herdendorf et al. | |
| 7,508,617 B2 | 3/2009 | Mak et al. | |
| 7,542,868 B2 | 6/2009 | Herdendorf et al. | |
| 7,573,668 B2 | 8/2009 | Kwon et al. | |
| 7,644,493 B2 | 1/2010 | Nayar et al. | |
| 7,646,559 B1* | 1/2010 | Cheung | G11B 5/59633 360/75 |
| 7,672,083 B1 | 3/2010 | Yu et al. | |
| 7,679,852 B2 | 3/2010 | Shaver et al. | |
| 7,684,948 B2 | 3/2010 | Holwell et al. | |
| 7,805,830 B2 | 10/2010 | Herdendorf et al. | |
| 8,169,749 B2 | 5/2012 | Keshavan et al. | |
| 8,477,444 B1* | 7/2013 | Zou | G11B 5/746 360/78.09 |
| 8,480,066 B2 | 7/2013 | Anderson et al. | |
| 9,218,833 B1 | 12/2015 | Shah et al. | |
| 10,269,380 B1 | 4/2019 | Sun et al. | |
| 10,622,012 B1 | 4/2020 | Tu et al. | |
| 10,783,911 B1* | 9/2020 | Tsai | G11B 5/59688 |
| 10,803,891 B1 | 10/2020 | Jacoby et al. | |
| 11,094,347 B1 | 8/2021 | Herdendorf et al. | |
| 2001/0030822 A1* | 10/2001 | Boutaghou | G11B 5/6058 |
| 2006/0056096 A1 | 3/2006 | Nakajima et al. | |
| 2006/0126206 A1 | 6/2006 | Takagi et al. | |
| 2020/0227077 A1 | 7/2020 | Sukla et al. | |
| 2023/0260547 A1* | 8/2023 | Liu | G11B 5/59627 360/77.02 |

OTHER PUBLICATIONS

U.S. Appl. No. 17/163,983, filed Feb. 1, 2021, entitled "Ramp Activation Systems for an Elevator Drive", 34 pages.

U.S. Appl. No. 17/233,818, filed Apr. 19, 2021, entitled "Zero Skew Elevator System", 51 pages.

U.S. Appl. No. 17/172,684, filed Feb. 10, 2021, entitled "Adjusting HGA Z-height via HSA Elevator Using Head/Actuator Feedback", 24 pages.

U.S. Appl. No. 17/016,326, filed Sep. 9, 2020, entitled "Brake Crawler for Elevator Type Hard Disk Drives", 30 pages.

* cited by examiner

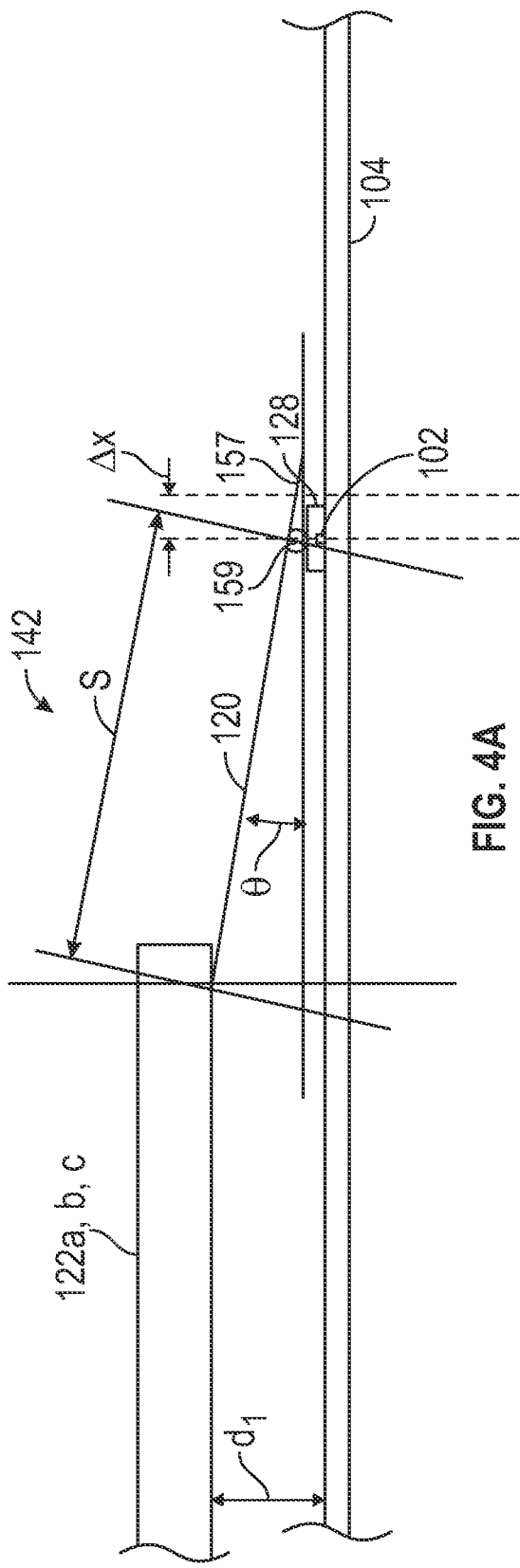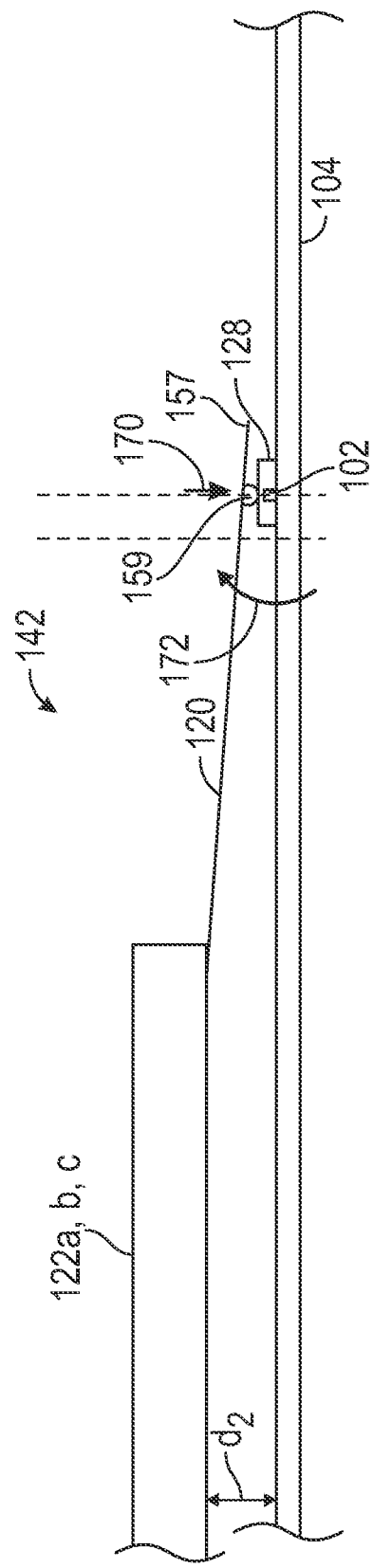
FIG. 4A
FIG. 4B

Z-HEIGHT CONTROL FOR DISC DRIVE USING SERVO WEDGE TIMING

SUMMARY

In one embodiment, a data storage device comprises a data storage disc, an actuator arm assembly, a servo clock, and a feedback and control system. The data storage disc comprises a top surface, and bottom surface, and a servo wedge. Each of the top and bottom surfaces is parallel to an x-y plane. The servo wedge comprises a top surface boundary of the servo wedge and a bottom surface boundary of the servo wedge. The actuator arm assembly supports a head pair configured for interaction with the top and bottom surfaces. The servo clock is configured to determine a top time at which the head pair encounters the top surface boundary of the servo wedge and a bottom time at which the head pair encounters the bottom surface boundary of the servo wedge during a disc read/write interaction. The feedback and control system is configured to determine an operation time difference between the top and bottom times; compare the operation time difference to a certification time difference correlating to a target vertical position of the actuator arm assembly relative to the disc; and move the actuator arm assembly to the target vertical position based on a comparison of the operation time difference and the certification time difference.

In another embodiment, a data storage device comprises a data storage disc, an actuator arm assembly and a feedback and control system. The data storage disc comprises a data track, a top surface and a bottom surface, and a servo wedge. Each of the top and bottom surfaces is parallel to an x-y plane. The servo wedge comprises a top surface boundary of the servo wedge and a bottom surface boundary of the servo wedge, wherein the top surface boundary and the bottom surface boundary are spaced apart by a distance along the data track. The actuator arm assembly comprises a first actuator arm and a second actuator arm. The first actuator arm supports a first head configured for interaction with the top surface, and the first actuator arm is spaced at a Z-height from the top surface. The second actuator arm supports a second head configured for interaction with the bottom surface. The feedback and control system is configured to employ a transfer function relating the Z-height to the distance and change the Z-height based on the transfer function.

In yet another embodiment, a method comprises writing a servo wedge onto a data storage disc having a top surface and a bottom surface, each of the top and bottom surfaces being parallel to an x-y plane. The writing results in a top surface boundary of the servo wedge and a bottom surface boundary of the servo wedge. During a disc certification event, the method comprises supporting a head pair on an actuator arm assembly while the disc rotates at a spin speed measurable in revolutions per minute (rpm); flying the head pair at a data track located at radius R from a disc center, wherein the head pair encounters the top surface boundary of the servo wedge at a first time and wherein the head pair encounters the bottom surface boundary of the servo wedge at a second time, thereby defining a certification time difference ($\Delta T_c$) between the first and second times; and determining a target Z-height ($d_1$) between a first actuator arm of the actuator arm assembly and the top surface at the data track. During a disc read/write interaction, the method comprises flying the head pair at the data track while the disc rotates at the spin speed, wherein the head pair encounters the top surface boundary of the servo wedge at a third time, and wherein the head pair encounters the bottom surface boundary of the servo wedge at a fourth time, thereby defining an operation time difference ($\Delta T$) between the third and fourth times. The method comprises determining an amount ($\Delta T_Z$) by which the operation time difference ($\Delta T$) is changed from the certification time difference ($\Delta T_c$) and employing $\Delta T_Z$ to move the first actuator arm toward the target Z-height ($d_1$).

Other features and benefits that characterize embodiments of the disclosure will be apparent upon reading the following detailed description and review of the associated drawings.

BRIEF DESCRIPTION OF THE DRAWINGS

FIG. 4A is a partial side elevation view of a head end of a head stack assembly with the actuator arm at a Z-height distance $d_1$ from a disc surface.

FIG. 4B is similar to FIG. 4A but shows the actuator arm at a smaller Z-height distance $d_2$ from the disc surface.

Figure 1:
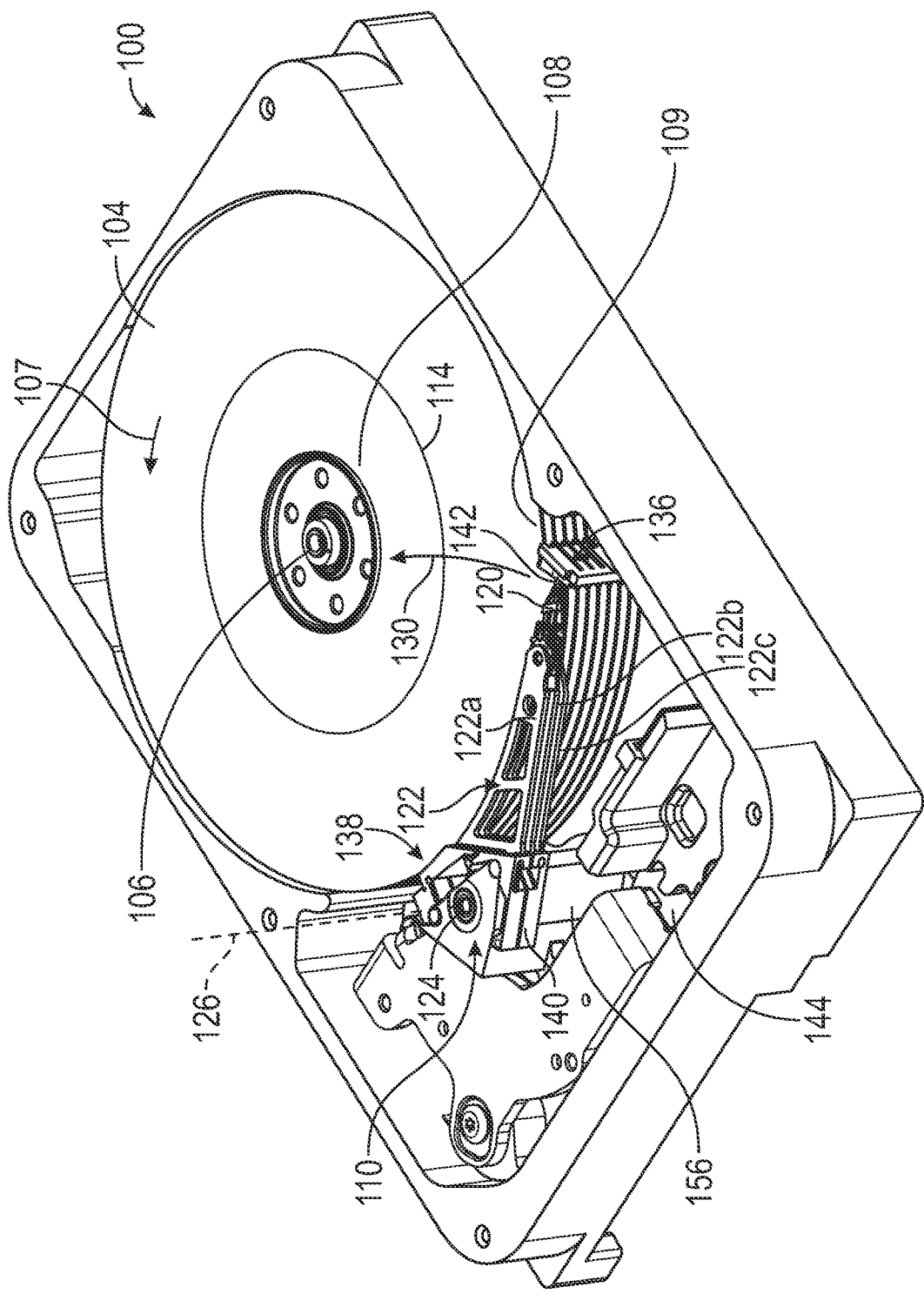
FIG. 1 is a perspective view of an exemplary data storage device configured to employ Z-height control in accordance with this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION OF ILLUSTRATIVE EMBODIMENTS

In general, embodiments of the disclosure relate to a data storage device with a high precision elevator system equipped to provide control and corrections for Z-height (gap between an actuator arm tip and a data storage disc surface). An actuator arm assembly with a head-suspension pair (for top and bottom disc surfaces) is mounted on an elevator drive to move up and down and reach all disc surfaces. The Z-height affects mechanical performance and read/write performance. Higher data storage density on the discs may be obtained by reading and writing data on narrower tracks on the discs and by maintaining a corresponding Z-height gap between the actuator arm and the data storage surfaces. Maintaining the Z-height within an acceptable range is becoming increasingly difficult as that range is reduced to obtain higher data storage densities. Operation outside the acceptable Z-height range may result in an unacceptable read/write bit error rate and/or undesirable contact between a head at the actuator arm tip and a data storage surface and potential loss of data and/or damage to the data storage surface.

Embodiments of this disclosure do not utilize additional sensors, such as an optical sensor. Rather, an exemplary adjustment method measures a time difference of a servo wedge between a top surface and a bottom surface of a disc. At completion of a servo information write process on a disc, servo wedge boundaries on the top and bottom surfaces are set. When a head pair flies over and under the disc as the disc rotates at operating speed, the head pair may encounter the top and bottom servo wedge boundaries at difference times. During a drive certification process, target drive operation parameters are determined. A time difference of the servo wedge between the top surface and the bottom surface at a target Z-height is designated $\Delta T_c$. Later, during use of the disc drive for reading and writing interactions, the head encounters the top and bottom servo wedge boundaries at a measured time difference: $\Delta T$.

A transfer function correlates Z-height and a time difference at which a head pair encounters top and bottom servo wedge boundaries during of horizontal (disc rotation) motion. A change in Z-height (between the target certification condition and the actual operation condition) is proportional to the time difference change of the servo wedge between the horizontal top and bottom surfaces (between the target certification condition and the actual operation condition):

$$\Delta T_z = \Delta T - \Delta T_c$$

This $\Delta T_z$ is used as feedback for the elevator to adjust the Z-height so that the measured time difference again equals $\Delta T_c$: in effect, so that $\Delta T_z$ is zero. When the time difference of the servo wedge is the same during operation as the result during the certification process, the Z-height is at its target for achieving the desired read/write performance. The height elevation of the actuator arm is adjusted using the elevator, based upon read-back data from the head and a servo clock circuit. Other features and benefits that characterize embodiments of the present invention will be apparent upon reading the following detailed description and review of the associated drawings.

It should be noted that the same or similar reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. FIG. 1 is a schematic illustration of a data storage device (DSD) 100, such as a hard disc drive (HDD), including data storage media, heads for reading data from and/or writing data to the data storage media and a ramp assembly for supporting the heads when they are positioned off the data storage media.

In data storage device 100, heads 102 (such as provided on an air bearing slider 128, labeled in FIGS. 4A and 4B) may be positioned over or under storage media 104 to read data from and/or write data to the data storage media 104. In the embodiment shown in FIG. 1, the data storage media 104 are rotatable data storage discs, with each disc 104 having opposing surfaces that serve as data storage surfaces. The discs 104 each have two (upper and lower) surfaces, and information is stored on one or both of the surfaces. The surfaces are coated with a magnetizable medium that is magnetized in alternate directions to store the information. The surfaces are computer-readable media holding the information including computer-readable data and computer-readable and computer-executable instructions. The information is arranged in tracks 114 in the media of the discs 104. For read and write operations, a spindle motor 106 rotates the discs 104 as illustrated by arrow 107 and an actuator mechanism 110 positions the heads 102 (on head end 142 of actuator arm assembly 122) relative to data tracks 114 on the rotating media 104 between an inner diameter (ID) 108 and an outer diameter (OD) 109. Both the spindle motor 106 and actuator mechanism 110 are connected to and operated through drive circuitry. The embodiments of the present disclosure are equally applicable to disc drives in which information is stored in thousands of concentric circular tracks 114 in the media of each disc 104, or in disc drives in which information is stored in a single track arranged as a continuous spiral 114 in the media of each disc 104.

Each of heads 102 is carried by a slider 128 and is coupled to the actuator mechanism 110 through a suspension assembly having a load beam 120 connected to an actuator arm assembly 122 of the mechanism 110, for example through a swage connection. The suspension assembly can also be referred to as a load spring or flexure. The actuator mechanism 110 is rotationally coupled to a frame or base deck 144 through a bearing 124 to rotate about axis or shaft 126. The actuator mechanism 110 moves the heads 102 in a cross-track direction as illustrated by arrow 130. Each of the heads 102 includes one or more transducer elements, such as inductive, magnetoresistive and magneto-optical transducer elements, which are coupled to head circuitry through a flex circuit.

In general, in order to keep read/write heads 102 from landing on discs 104 in a data storage device 100 when, for example, power is removed from the data storage device 100, and to prevent the heads 102 from colliding with outer edges of the discs 104 during load and unload operations, a head support ramp assembly 136 is provided adjacent to the OD 109 of the discs 104. A lift tab 157 (labeled in FIGS. 4A-4C) extends from the load beam 120 to rest on the head support ramp assembly 136 when the disc drive storage device 100 is in an "off" or non-operating state.

Figure 4C:
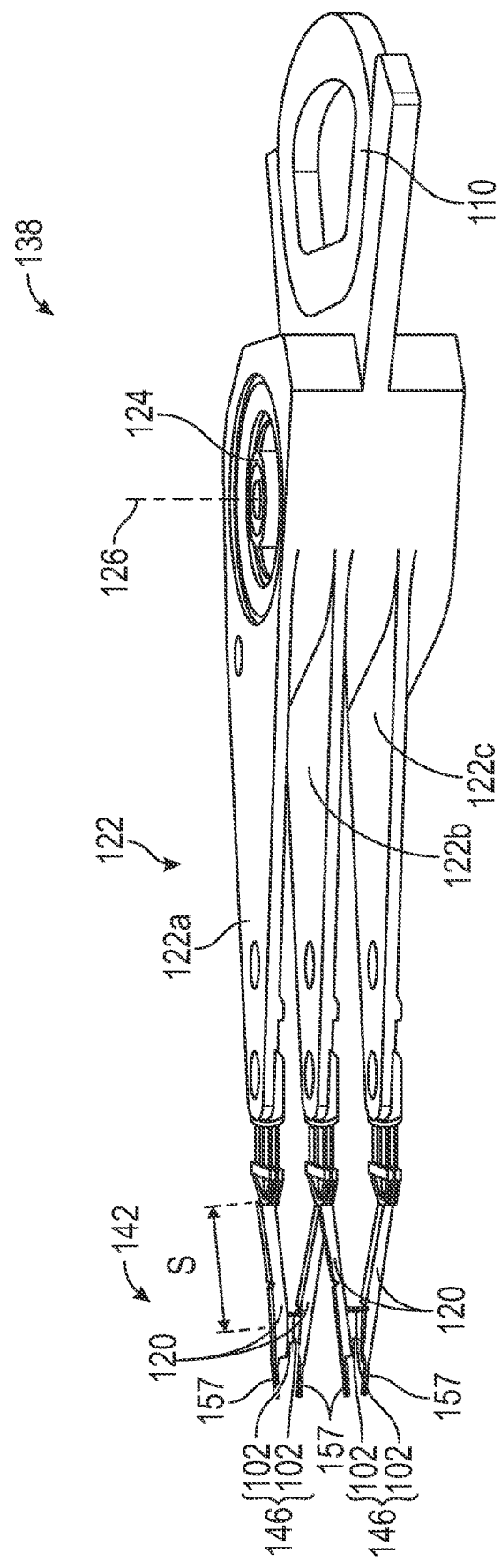
FIG. 4C is a perspective view of an exemplary head stack assembly.

In data storage device 100, a number of heads 102 is less than a number of disc 104 surfaces. For example, as illustrated in FIG. 1, data storage device 100 includes multiple discs 104 and an actuator arm assembly 122 with an upper actuator arm 122a, a middle actuator arm 122b, and a lower actuator arm 122c. The actuator mechanism 110, the load beams 120 and the actuator arm assembly 122 are collectively referred to as the head stack assembly (HSA) 138. As shown in FIG. 4C, in an exemplary HSA 138, a first pair of load beams 120 extends from the ends of actuator arms 122a and 122b to support a first pair 146 of heads 102. The first pair 146 of heads 102 face each other to interact with top and bottom surfaces of a disc that can be received between the actuator arms 122a, 122b when the HSA 138 is moved to the disc stack, as shown in FIG. 2B. Such top and bottom surfaces are parallel to an x-y plane in this description. A second pair of load beams 120 extends from the ends of actuator arms 122b and 122c to support a second pair 146 of heads 102. The second pair 146 of heads 102 face each other to interact with top and bottom surfaces of a second disc that can be received between the actuator arms 122b, 122c when the HSA 138 is moved to the disc stack. When the actuator arm assembly 122 is moved off the disc stack, as in FIGS. 1 and 5, elevator 140 can be used to move the HSA 138 vertically to allow the head pairs 146 to access any particular disc 104 of the stack of discs. In an embodiment, first and second actuator arms 122a,b,c supporting a head pair 146 are physically connected, so they move together.

In data storage device 100 of FIG. 1, the HSA 138 may be moved vertically (z-direction, perpendicular to the x-y plane) along axis 126 to different positions under motive of an elevator 140. Head support ramp assembly 136 supports head end 142 of HSA 138 when the HSA 138 is moved away from the data storage disc(s) 104. Head-support ramp assembly 136 in some embodiments is designed as a split ramp with a stationary portion and moveable portion. In order to move the HSA 138 from either an upper position to a lower position or from a lower position to an upper position, the HSA 138 is first rotated about axis 126, or otherwise moved in the x-y plane, until a head end 142 of the HSA 138 is supported on a moveable portion of the head-support ramp assembly 136. Then, the HSA 138 and the moveable portion are moved in unison along axis 126 (such as vertically or in a z direction). An entire ramp 136 or a portion thereof can also be moved in the x-y plane off the disc stack, such as by retraction, flexing, or rotation, for example. Suitable configurations for ramp assembly 136 include those described in the following commonly owned patent applications, which are hereby incorporated by reference: U.S. application Ser. No. 16/863,287 filed on Apr. 30, 2020, entitled "Split Ramp for Data Storage Devices;" and U.S. application Ser. No. 17/163,983 filed on Feb. 1, 2021, entitled "Ramp Activation Systems for an Elevator Drive."

In one embodiment, a base of elevator 140 may be driven up and down by a coil and a magnet (not shown) with hard stops at both ends that limit the extent of upward and downward movement of the HSA 138. In general, any suitable driving mechanism may be used to move elevator 140 up and down. Exemplary drivers for Z direction motion of elevator 140 include a piezoelectric motor, a ball screw with an internal motor, a voice coil motor, an inchworm style brake crawler, a linear motor, a shape memory alloy based actuator, and a combination of the above. Elevator configurations are described in the following commonly owned patents and applications, which are hereby incorporated by reference: U.S. Pat. No. 10,269,380 for "Disk Drive Having Multiple Disks Accessible by a Reduced Number of Read/Write Heads" and U.S. application Ser. No. 17/233,818 filed on Apr. 19, 2021, entitled "Zero Skew Elevator System." In some embodiments, an elevator is not used because the HSA includes the same number of heads as the number of disc surfaces, and many actuator arms are attached to an E-block or comb of the actuator.

For use of heads 102 for reading and writing data relative to disc 104, actuator 110 is activated to move the head end 142 of HSA 138 off of the head support ramp assembly 136 and to the disc 104. To move head end 142 of HSA 138 onto a disc 104, actuator arm assembly 122 rotates about cylindrical bearing 124 and pivot axis 126. Rotation of actuator arm assembly 122 about pivot axis 126 results in moving the head end 142 of HSA 138 in an arc-shaped cross track direction 130 to a selected track 114. Head 102 may, for example, include a magnetoresistive (MR) element and/or a thin film inductive (TFI) element, such as reader 150 and writer 153 (labeled in FIG. 2B). The actuator assembly 110 also includes a motor, such as a voice coil motor (VCM), which pivots the actuator arm assembly 122 about axis 126 to move its head end 142 across the stack of discs 104, following arc 130. The spindle motor 106 and actuator arm assembly 122 are coupled to a servo circuit, read/write channel circuit, data formatter circuit and other associated electronic circuits, which can be enclosed within one or more integrated circuit packages mounted to a printed circuit board (PCB). Electronic circuits 300 (see FIG. 3) can include analog circuitry and/or digital circuitry, such as a gate array and/or microprocessor-based instruction processing device.

Figure 2A:
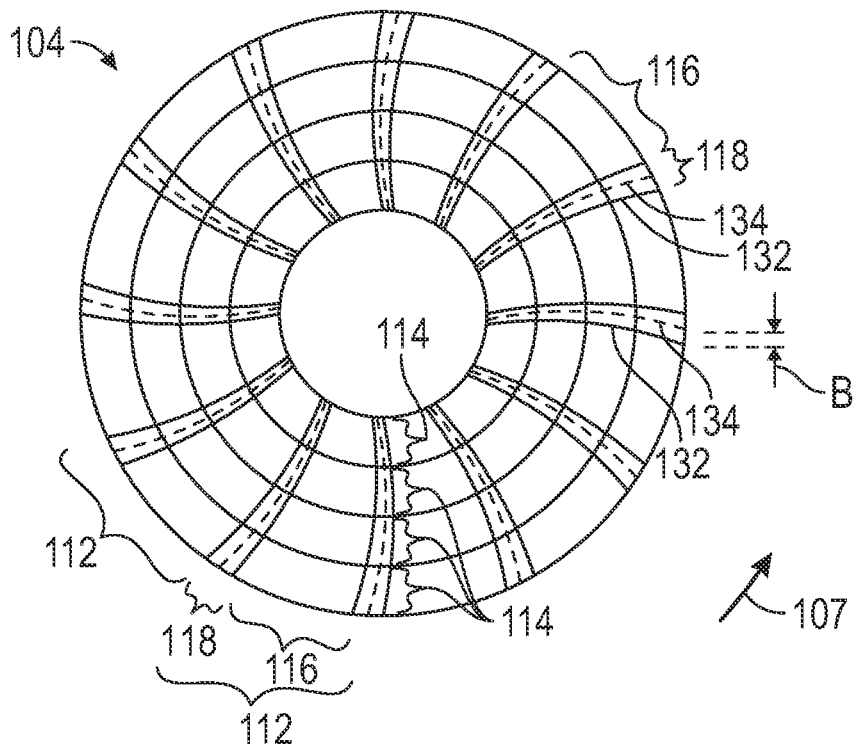
FIG. 2A is a top view of a disc that illustrates tracks, servo wedges, and data wedges.
Figure 2B:
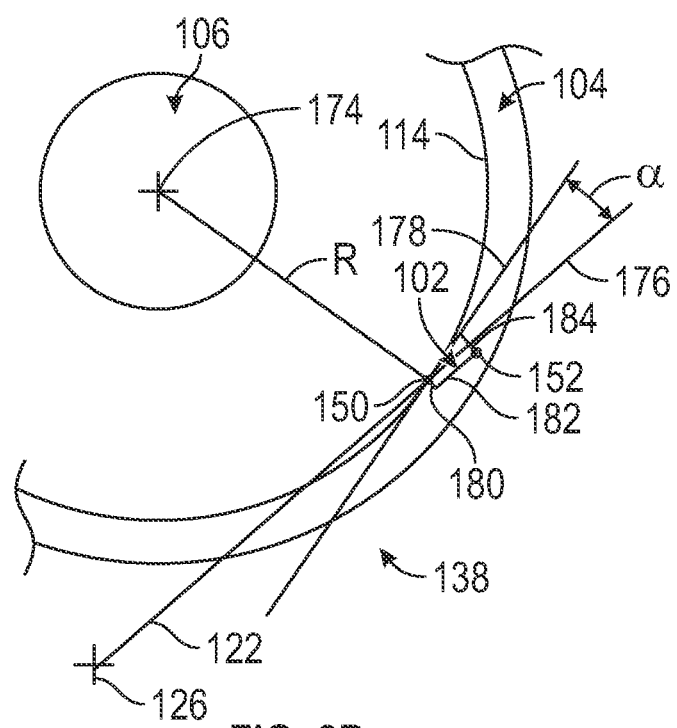
FIG. 2B is a partial top view of a disc that illustrates relationships of various features relative to the actuator arm assembly pivot and a reader and writer of an exemplary head slider.

FIG. 2A illustrates tracks and wedges on the disc 104. Data is stored on the disc 104 within a number of concentric tracks 114 (or cylinders of the stack of discs 104). Each track 114 is also divided into a plurality of radially extending wedges 112. Each wedge 112 is further sub-divided into a plurality of data wedges 116 defined between servo wedges 118. The servo wedges 118 are narrow, radially curved wedges or fields embedded in the media to store servo information.

Servo wedges 118 are embedded among sectors on each track 114 to enable the disc drive 100 to control the position of the heads 102 over the center of a track 114. In some cases, the servo wedges 118 are written to the discs 104 during the manufacture of a disc drive 100 using a highly precise external servowriter. A multi disc writer (MDW) machine can write many discs simultaneously; the written discs can then be assembled in an individual HDD. As the servo wedges 118 are subsequently used to define the tracks 114, the positions of the servo writing heads are precisely controlled as the servo wedges 118 are written to the disc surfaces. Thus, a typical servo track writer comprises an actuator positioning system that advances the position of the heads, a laser based position detector that senses the position of the heads, and control circuitry that provides the servo information to be written to the servo wedges 118 on the discs. The positioning system in an external servowriter includes a pusher pin assembly that engages the actuator assembly through an opening in the disc drive base deck 144. The position detector detects the position of the heads by detecting the radial position of the pusher pin assembly.

Alternatively, tracks 114 may be written by a self-servowriter. The self-servowriter controls the position of the heads 102 directly by applying current to the coil of the disc drive voice coil motor. Self-propagated servo track writing was first described in U.S. Pat. No. 4,414,589 (Oliver et al.). In Oliver's method, the drive's actuator arm is positioned at one of its travel range limit stops. A first reference track is written with the write element. The first reference track is then read with the read element as the head is radially displaced from the first reference track. When a distance is reached such that the read element senses a predetermined percentage of the first reference track's amplitude, a second reference track is written. The predetermined percentage is called the "reduction number." The self-servowriting process ends when the actuator arm's second limit stop is reached and the entire disc surface is filled with reference tracks. The servowriter then checks to see whether a target number of tracks are written on the disc. If the total number of written tracks is unacceptably higher than the target number, the disc is erased, the reduction number is lowered so that a larger displacement occurs between tracks, and the process is repeated. Likewise, if the total number of written tracks is unacceptably lower than the target number, the disc is erased, the reduction number is increased so that a smaller displacement occurs between tracks, and the self-servowriting process is repeated. More information on servo writing is described in commonly owned U.S. Pat. No. 6,765,744 for "Track Pitch Control Using Head Offset Measurement for Self-Servowriting Tracks in a Disc Drive," which is hereby incorporated by reference.

The servo information includes track numbers, sector numbers, and tracking information to be read by the read/write head 102. The track numbers and sector numbers identify the track and sector over which the read/write head 102 is positioned. Servo information is written as signals or bursts in servo wedges 118 across the media. A servo burst is a particular magnetic signature on a track that facilitates positioning of heads over tracks. The bursts are used to determine a position of a read/write head 102 relative to a track 114 in the media, and the tracking information is used by a feedback control system or feedback circuit 168 in the integrated circuits 300 to control the position of the read/write head 102 (see FIG. 3).

Accurate positioning of the head 102 allows data to be properly written onto and read from sectors of the data wedges 116. The data wedges 116 are where non-servo related data (such as user data) is stored and retrieved. User data can be stored in blocks, called sectors, in the data wedges 116 on the disc 104. A typical sector size is 512 bytes of user data, although various other sector sizes can be used. For example, some other sector sizes include, but are not limited to, 520 bytes, 528 bytes, 1024 bytes, and 4096 bytes; however, the sector size is not necessarily based on a power of two. Because the data storage device 100 is a random access device, any number of sequential sectors can be written, although sectors immediately prior to or subsequent to the written sector, in some disc drives, may not be written. Similarly, sector read operations can include any number of sequential sectors starting and ending at any position along a track 114. Therefore, each sector typically contains fields that can be read and written independently of other sectors on the track 114.

Figure 3:
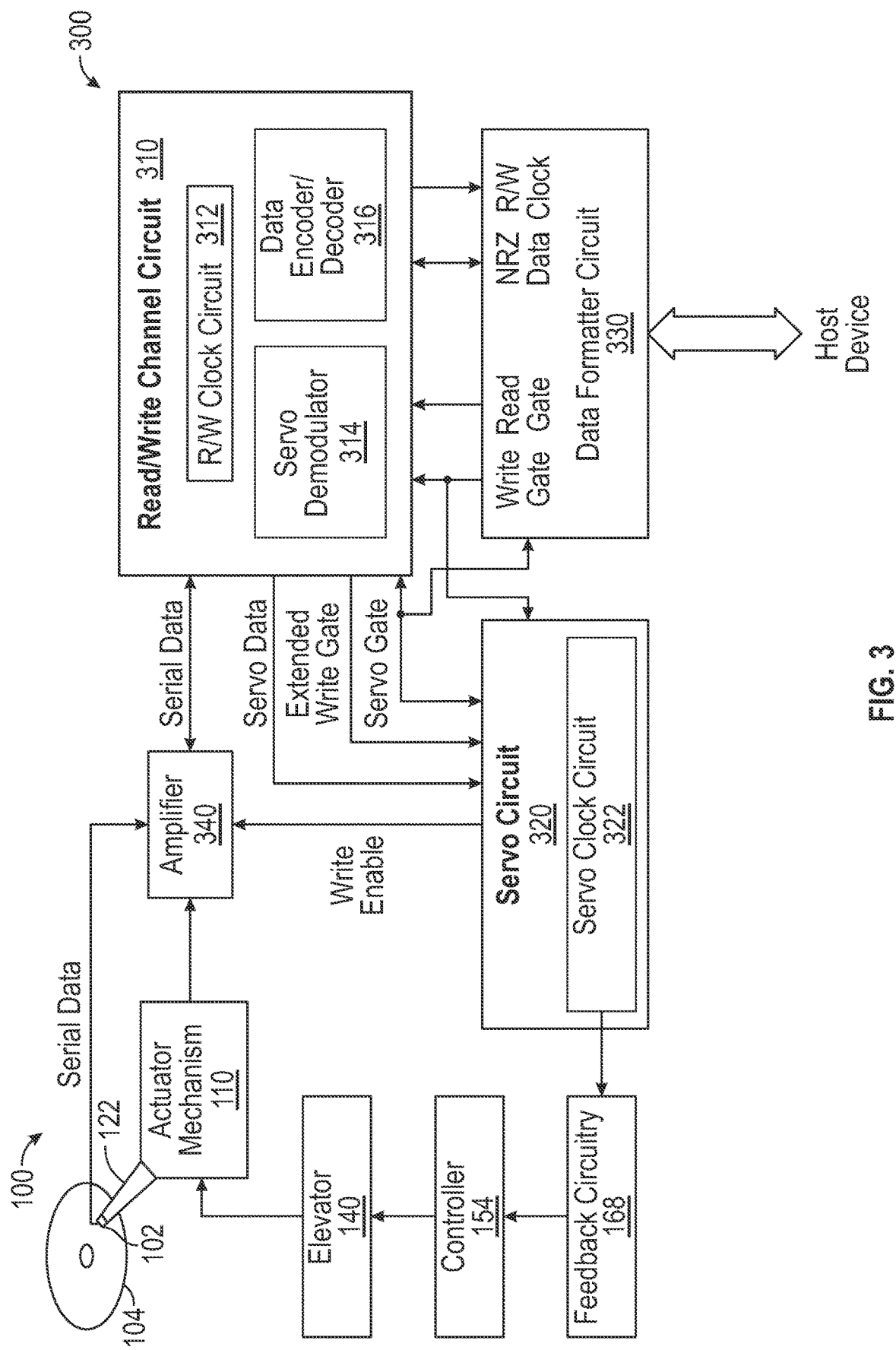
FIG. 3 is a block diagram of electronic circuits of an exemplary data storage device.

As shown in FIG. 3, the data storage device or disc drive 100 also includes circuitry 300 for encoding data and instructions written to the media and for decoding data and instructions read from the media. A controller 154 such as a microprocessor controls most operations of the data storage device 100, such as transmitting information including instructions or data read from the media back to a requesting computer and receiving data or information from the requesting computer (such as a Host Device) for writing to the media. Information representative of data or instructions is stored in tracks 114 in the media. A read/write head 102 is positioned over a track 114 to write information to or read information from the track 114. Once the operation is complete, the read/write head 102 may be controlled to move to a new target track 114 to write information to or read information from the new target track 114. The movement takes place in the following modes. The read/write head 102 is moved along an arc 130 across the media of a disc 104 in a seek mode to position it near a target track 114. The read/write head 102 is then positioned over the target track 114 during a track-and-follow mode, also called a tracking mode, to read or write the information stored in the target track 114. Servo information is read from the servo wedge 118 of the target track 114 by the read/write head 102, and a feedback control system determines a position error signal from the servo information. If the read/write head 102 is not in a correct position, it is moved to a desired position over the target track 114 in response to the position error signal.

An exemplary electronic circuit assembly 300 controls current in a voice coil motor and elevator, and thus resulting movements, of the actuator assembly 110. The integrated circuits 300 are coupled to the read/write head 102 in the slider 128 (shown in FIGS. 4A and 4B) for providing a signal to the read/write head 102 when information is being written to the media on the discs 104 and for receiving and processing a read/write signal generated by the read/write head 102 when information is being read from the media on the discs 104. A feedback control system 168 in the circuits 300 may receive servo information read from the media through the read/write heads 102. The feedback control system 168 determines a position error signal from the servo information. If the read/write heads 102 are not in a correct position, they are moved to a desired position over a target track in response to the position error signal. The controller 154 may include a microprocessor, a digital signal processor, or one or more state machines to control operations of the data storage device 100. The integrated circuits 300 may also include memory devices such as electronically erasable programmable read-only memory (EEPROM) and dynamic random-access memory (DRAM) devices and modulation and amplification circuits.

In an exemplary embodiment, circuits 300 include a read/write channel circuit 310, a servo circuit 320, a data formatter circuit 330, and an amplifier 340 in accordance with some embodiments. The read/write channel circuit 310 includes a read/write clock circuit 312, a servo demodulator 314, and a data encoder/decoder 316. Although the read/write channel circuit 310, the servo circuit 320, the data formatter circuit 330, the amplifier 340, and other elements have been shown as separate blocks for ease of illustration and discussion, it is to be understood that their functionality described herein may be integrated within a common integrated circuit package or distributed among a plurality of discrete integrated circuit packages. The amplifier 340 amplifies a read signal from the head 102 and provides the amplified read signal to the read/write channel circuit 310. The amplifier 340 also amplifies a write signal from the read/write channel circuit 310 that is conducted through the head 102 to write on the disc 104.

The servo demodulator 314 demodulates servo data in the read signal as the head 102 reads the servo wedges 118 and the disc spins in direction 107 (see FIG. 2A). The servo wedges 118 can include a phase-locked oscillator (PLO) field, a servo address mark (SAM) field, a binary coded track identification field, a wedge number field, and a servo burst field of circumferentially staggered, radially offset servo bursts. The servo demodulator 314 demodulates servo signals read from the servo wedges 118 to generate servo data, which it communicates to the servo circuit 320. The servo circuit 320 generates a servo gate signal having a logic state that indicates the occurrence of a top surface boundary 132 of a first servo wedge ("servo") 118 as the head 102 reads from the top surface of disc 104. Similarly, the servo circuit 320 generates a servo gate signal having a logic state that indicates the occurrence of a bottom surface boundary 134 of the first servo wedge ("servo") 118 as the head 102 reads from the bottom surface of disc 104. The servo circuit 320 controls the motor in actuator 110 to seek the head 102 to a target track and sector using the track identification field, the SAM, and the wedge number field read from the servo wedges 118. The servo circuit 320 may then maintain alignment of the head 102 relative to the target track using the servo burst fields read from the servo wedges 118.

The illustrations are not drawn to scale. In particular, for ease of understanding, the sizes of tracks 114 and distances between the top boundary 132 of a servo wedge 118 and a bottom boundary 134 of the servo wedge 118 on opposite sides of the disc 104 are greatly exaggerated.

In an idealized servo write process, the top and bottom boundaries 132, 134 of the servo wedge 118 would be aligned in a Z direction that is perpendicular to an x-y plane defined by a media surfaces of the disc 104. However, in an actual servo write process, the top and bottom boundaries 132, 134 of a servo wedge 118 are offset because of many non-ideal factors, including slight differences in the locations of the servo writing heads relative to the top and bottom surfaces of the disc, as well as differences in Z-height of actuator arms carrying the servo writing heads relative to the top and bottom surfaces. After the servo information is written during the servo write process, these differences between the top and bottom boundaries 132, 134, if any, are fixed on the disc media. As shown in FIG. 2A, for each servo wedge 118, a servo wedge boundary of the top surface 132 may be displaced (by distance B) in the circumferential track direction from a servo wedge boundary 134 of the bottom surface of the disc 104. An explanation for an on-track displacement $\Delta x$ due to a Z-height d difference is presented below with reference to FIGS. 4A and 4B. Thus, the distance B may be due to Z-height differences of heads used in writing the servo wedge boundaries but could also be due to additional factors such as minute differences in suspension lengths S, for example. In an exemplary system and method, Z-height control is based on a feedback signal from a servo clock regarding a time difference of the head pair 146 (shown in FIG. 4C) in encountering the servo wedge boundaries of top surface and the bottom surface of the disc. This method is accurate because of the sensitivity and precision of servo clocks. A suitable exemplary clock is a 240 Megahertz (MHz) Servo Clock. In an exemplary embodiment, a servo clock measures a top time at which a first head 102 of the pair 146 encounters the top surface boundary 132 and measures a bottom time at which a second head 102 of the pair 146 encounters the bottom surface boundary 134. A difference between the top and bottom times is used in a feedback signal to a feedback and control system in device 100.

Returning to FIG. 3, the data encoder/decoder 316 of the read/write channel circuit 310 decodes data in the read signal as the head 102 reads the data wedges 116 and carries out error detection and correction on the decoded data to generated recovered data that is output to the data formatter circuit 330. The data encoder/decoder 316 may, for example, output non-return-to-zero (NRZ) formatted data. The data formatter circuit 330 combines the data from the data encoder/decoder 316 into blocks and may carry out further formatting of the data, and then communicates the formatted data to a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the data storage device 100. The data formatter circuit 330 also formats data from the host device, for example as NRZ formatted data, which is output to the data encoder/decoder 316. The data encoder/decoder 316 encodes the data (e.g., adds error detection and error correction information) which is subsequently written through the amplifier 340 and the head 102 onto the disc 104.

Because the data wedges 116 and the servo wedges 118 alternate repetitively along a track 114, the read/write channel circuit 310, the servo circuit 320, and the data formatter circuit 330 are configured to cooperatively identify the relative location and timing of the head 102 to the data wedges 116 and servo wedges 118. A servo gate signal communicated between the servo circuit 320 and the read/ write channel circuit 310 is modulated to indicate whether the head 102 is reading one of the servo wedges 118 or one of the data wedges 116. The data formatter circuit 330 generates a read gate signal to cause the read/write channel circuit 310 to receive and decode data (via the data encoder/decoder circuit 316) when the servo gate signal indicates that the head 102 is reading a target sector in a target data wedge 116. The data formatter circuit 330 also generates a write gate that causes data that it outputs to the read/write channel circuit 310 to be encoded (via the data encoder/decoder circuit 316) and written through the amplifier 340 and head 102 onto the disc 104.

As seen in FIG. 2A, the servo circuit 320 generates a write enable signal in response to the write gate signal and the extended write gate signal to selectively enable and inhibit writing, so as to allow writing in the data wedges 116 and to prevent writing in any of the servo wedges 118. The servo circuit 320 operates in response to a servo clock signal that is generated by a servo clock circuit 322. The servo clock circuit 322 generates a fixed frequency servo clock signal which may have a frequency that corresponds to the nominal frequency of the PLO field or other data fields in the servo wedges 118. The servo clock circuit 322 may also be configured to align the phase of an edge transition of the servo clock signal to one or more timing events in the servo data, such as phase aligning to detection of a zero-crossing in the PLO field or other servo data fields.

The read/write channel circuit 310 and the data formatter circuit 330 operate in response to a read/write clock signal that is generated by a read/write clock circuit 312. In accordance with various embodiments, the data formatter circuit 330 can be synchronized to timing of certain information on the rotating disc 104, which can reduce timing uncertainty in the operation of the data formatter circuit 330 and the servo demodulator 314. The servo demodulator 314 and the data encoder/decoder 316 may be configured to operatively cause the read/write clock circuit to align the phase of a transition edge (e.g., rising/falling edge) of the read/write clock signal to defined events that are repetitively detected in the read signal and which indicate that head 102 is leaving a servo wedge 118. For example, the read/write clock circuit can be configured to align the phase of a transition edge of the read/write clock signal in response to the servo demodulator 314 detecting a SAM in a servo wedge 118.

The phase aligned read/write clock signal provides the data formatter circuit 330 with an accurate, predictable indication of the timing of defined events on the rotating disc 104. The data formatter circuit 330 may thereby operate with reduced uncertainty or "timing jitter" relative to the timing of defined events on the rotating disc 104 and may, thereby, allow use of shorter gap lengths and/or PLO field lengths, and may enable higher data capacities and/or linear bit densities to be achieved on the disc 104. Additional information about operation of electronic circuits 300 is described in a commonly owned patent, which is hereby incorporated by reference: U.S. Pat. No. 7,679,852, entitled "Adjustment of Read/Write Clock Edge Timing."

The servo clock circuit 322 may generate a constant frequency servo clock signal irrespective of the radial location of the head 102. The servo circuit 320 generates the leading edge (rising edge) transition of the servo gate signal in response to a head 102 entering the servo wedge 118 at the top or bottom servo wedge boundary 132, 134. As the head 102 reads the servo wedge 118, the servo demodulator 314 recovers the servo data from the read signal. In response to detecting the SAM in the read signal, the servo demodulator 314 delays a defined number of PLO cycles in the read signal (or may delay a defined number of read/write clock signal cycles) and then generates the trailing edge (falling edge) transition of the servo gate signal and triggers the read/write clock circuit 312 to reset the phase of the read/write clock signal at the trailing edge of the servo gate signal. Because the PLO in the read signal is in phase with the servo data on the disc 104, it can provide a highly accurate time reference relative to the rotating disc 104.

FIGS. 4A and 4B are partial side elevation views of a head end 142 of a head stack assembly 138 (labeled in FIGS. 1 and 4C), illustrating a relationship between Z-height d and a down track slider 128 position, which defines a location of head 102 on a track 114 of disc 104. For ease of comprehension, the FIGS. 4A and 4B both show an actuator arm 122a,b,c located above a disc surface 104. However, it is to be understood that a similar relationship exists when an arm 122a,b,c is positioned below a disc surface with an upwardly facing head 102. The considerations shown in FIGS. 4A and 4B are equally applicable during a servo write process, a disc certification process, and a disc read/write interaction. Thus, the explanations here also apply to the servo write heads that are used to write the servo information in servo wedges 118, thereby in many cases resulting in the difference in on-track positions of the top boundary 132 of the servo wedge 118 on a top surface of the disc 104 versus the bottom boundary 134 of the same servo wedge 118 on a bottom surface of the disc 104. This offset difference between the top and bottom boundaries 132, 134 of the servo wedge 118 is shown in FIG. 2A as distance B. While distance B is a function of disc radius R, a time to travel distance B is constant for a given disc revolution speed.

FIG. 4A is a side schematic illustration of a portion of disc 104 with actuator arm 122a,b,c carrying load beam 120, which is connected to lift tab 157, gimbal 159 and slider 128 carrying head 102. In an exemplary, head 102 includes reader 150 and writer 152 (labeled in FIG. 2B). Head stack assembly (HSA) Z-height d is a distance between actuator arm 122a,b,c and a surface of a disc 104 directly above/below the actuator arm 122a,b,c. Once the head 102 is coarsely positioned over or under a particular disc surface, embodiments of the disclosure may be employed to make fine adjustments to the Z-height d by moving the elevator 140 (labeled in FIGS. 1 and 5) small distances up/down guide post 156 (in a vertical z-direction perpendicular to an x-y plane defined by the disc surfaces) in response to one or more feedback signals from feedback circuitry 168. Variations in the elevation of actuator arm 122a,b,c from the disc surface 104 can affect read/write clarity or resolution. Accordingly, the proposed system and methods dynamically control the elevation of actuator arm 122a,b,c and thus Z-height d to move toward a target Z-height (which was determined during certification of the data storage device 100).

The Z-height d (shown as $d_1$ in FIG. 4A and $d_2$ in FIG. 4B) is the distance between actuator arm 122a,b,c and the surface of disc 104. Load beam 120 is connected to actuator arm 122 and has a lift tab 157 at its distal end. A gimbal 159 is coupled to load beam 120, and a slider 128 carrying head 102 is coupled to gimbal 159. Each slider 128 is a small ceramic block that flies over the media of one of the discs 104. The slider 128 has an air bearing surface that is aerodynamically shaped to give the slider 128 lift when air flows between the slider 128 and the media. When the disc 104 rotates, air flow is induced between the slider 128 and the media, causing an aerodynamic lift force that lifts the slider 128 away from the media. The load beam 120 and gimbal 159 produce a force on the slider 128 directed toward the media. The forces on the slider 128 equilibrate such that the slider 128 flies over the media at a nominal fly height. The fly height, also called clearance, is a distance between the slider 128 and the media, and is a measure of an amount of air available to interact with the air bearing surface of the slider 128 as it is aerodynamically supported over the media. The fly height gap is generally on the order of a few microns and is not visible in the illustrations.

FIG. 2B is a top plane view of a portion of a disc 104 illustrating relationships between the actuator arm assembly pivot point 126 and a head 102 carried by the HSA 138. Slider 128 is not shown so as to not obscure the reader 150 and the writer 152, which together reside on the head 102 connected to the actuator arm assembly 122 having pivot point 126. In the illustrated embodiment of FIG. 2B, reader 150 is positioned on track 114 of disc 104 to perform a read operation thereon. Reader 150 is located at a radius R from the center 174 of spindle 106. As shown in FIG. 1, because the head end 142 of the head stack assembly 138 pivots on axis 126, the head end 142 travels in an arc 130 across the disc face, thereby introducing a skew angle alpha ($\alpha$ labeled in FIG. 2B) between the head alignment direction 176 and the tangent 178 of the track 114 on which reader 150 is positioned. On a slider 128, the writer 152 is positionally displaced from the reader 150 by read/write offset 180 and read/write separation 182. Read/write separation 182 is measured parallel to head alignment direction 176, while read/write offset 180 is measured perpendicular to the head alignment direction 176. In general, read/write offset 180 and read/write separation 182 are very small; typically, each of 180, 182 is on the order of about 7 micrometers or smaller. Offset distance 184 between writer 152 and tangent line 178 is termed the magnetoresistive (MR) offset.

Head 102 may include transducer elements such as reader(s) 150 and writer(s) 152 to read data from and/or write data to disc surfaces. In an exemplary embodiment head 102 is a MR head, having one head (reader 150) used for reading data from media and a second head (writer 152) for writing data to the media. MR heads may have additional heads used for other purposes, such as erasing the media. Head 102 may also include heaters or other fine positioning systems to cause the transducer element(s) to protrude closer to the disc surface, thereby providing a desired head-media spacing (HMS) for the transducer(s) to suitably carry out read/write operations. Head 102 may also include one or more sensors, such as a temperature coefficient of resistance sensor. Feedback signals obtained from such sensors and servo clock circuit 322 are obtained by feedback circuitry 168 and provided to controller 154, which may responsively actuate elevator 140 to move HSA 138 to control Z-height d.

In an exemplary embodiment, the controller 154 is coupled to exchange information with a memory device, such as through a bus. The memory device is a computer-readable medium that stores computer-readable and computer-executable instructions or data. The computer-readable and computer-executable instructions include active Z-height control instructions in the form of assembly code to implement the control system shown in FIG. 3 and the method 200 shown in FIG. 9. The controller 154 retrieves and executes the instructions to control the Z-height of the actuator arm 122a,b,c according to embodiments of the present disclosure.

Additional information relevant to high performance of a disc drive is provided in the following commonly owned patents and applications, which are hereby incorporated by reference: U.S. Pat. No. 6,501,606, entitled "Fly Height Control for a Read/Write Head over Patterned Media;" U.S. Pat. No. 6,717,776 entitled "Adjustable Fly Height Control Using an Adjustable Head Actuator Assembly;" U.S. Pat. No. 7,468,856 entitled "Estimation and Control of Head Fly Height;" and U.S. application Ser. No. 17/172,684 filed on Feb. 10, 2021, entitled "Adjusting HGA Z-height via HSA Elevator Using Head/Actuator Feedback."

Certain HDD designs have had failure modes related to head resonance and modulation fail modes that have been traced back to drive-level Z-height d being off-target. Fail modes that may be impacted by a deviation from nominal Z-height include head resonance and head modulation. A shift in Z-height d directly affects pitch static attitude and preload 170 (gimbal vertical stiffness multiplied by Z-height change, labeled in FIG. 4B) of the head. These changes directly affect pitch torque 172 and vertical forces experienced by each head 102 while flying above the disc 104. Alterations in the pitch torque 172 and the vertical force experienced by each head 102 may lead to either/both head resonance or/and change in fly attitude.

Direct measurements of Z-height d in certain HDD designs has revealed Z-height shifts in drive assembly. These Z-height shifts may be exacerbated due to variation in media lot thicknesses. It should be noted that other factors such as HSA tilt and/or disc tilt, the presence of burrs or other debris that effectively shift the HSA up, for example, may also contribute to the Z-height being off target. In general, variance of dimensions of drive components such as discs and spacers as well as HSA installation may contribute to Z-height shifts. The ability to control Z-height during a disc read/write interaction, and after assembly, adds margin against modulation and resonance failure modes, accommodates for fly height sensitivity to environmental changes, and increases drive capacity by allowing access to more OD tracks.

The HSA 138 is adjusted to a target Z-height d of a read/write operation with feedback from, for example, field adjust fly height (FaFH) algorithms. In one embodiment, positioning of the HSA may be carried out as follows. The feedback signal(s)/data are generated and/or obtained by circuitry 168, and provided to elevator 140, which carries out the fine positioning of the HSA 138 to adjust the Z-height d based at least in part on the received feedback signal(s)/data.

During read/write interactions or operations, active spacing of the head pair may be continuously monitored (by circuitry 168) for changes relative to the target Z-height d determined during drive calibration (such as certification in the factory, following manufacture), or the monitoring can be repeated at set time intervals, or the monitoring can be repeated when the head pair is moved to another track, or upon detection of a change in environment (such as pressure, humidity, or temperature), for example. In some embodiments, the Z-height d for the active head 102 in the drive (such as the head 102 performing the current read/write operation) is tuned. Stated another way, the HSA 138 position can be adjusted for each individual head-disc interface according to which interface is being written or read.

FIGS. 4A and 4B show a relationship between the Z-height d of an arm 122a,b,c and a down track displacement $\Delta x$. S is the length of a suspension or load beam 120 to gimbal 159. Angle $\Theta$ is the acute inclination angle between the load beam 120 and an x-y plane defined by the relevant surface of disc 104. A change in Z-height correlates to on-track slider motion. The change in Z-height is denoted as $\Delta d = d_1 - d_2$. The on-track or down track slider motion is denoted as $\Delta x$:

$$\Delta x = \frac{\Delta d \sin(\theta)}{\cos(\theta)} - \frac{\Delta d^2}{2S\cos^2(\theta)}$$

$$\Delta x \cong \frac{\Delta d \sin(\theta)}{\cos(\theta)}$$

A transfer function between the down-track slider motion $\Delta x$ to a time change $\Delta t$ is defined by the following relationship, wherein a is the skew angle and R is the track radius, as shown in FIG. 2B. The disc spin speed at operation as the spindle motor 106 rotates the disc 104 in direction 107 is expressed in revolutions per minute (rpm).

$$\Delta t = \frac{\Delta x \cos(\alpha)}{2\pi R} \times \frac{60}{rpm} = \Delta d \left( \frac{\sin(\theta)}{\cos(\theta)} \times \frac{\cos(\alpha)}{2\pi R} \times \frac{60}{rpm} \right) = k \times \Delta d$$

As shown above, the parenthetical expression can be simplified as a constant k that is constant for a given radius location R on the disc 104. In an exemplary implementation, this constant k is stored in the drive system data and retrieved when a field application is conducted at the same location R on the disc as the manufacturing certification test.

In an actuator arm assembly 122, the individual arms 122a, b, c, etc. are attached to each other at fixed vertical spacings. Accordingly, a Z-height change applies to both heads 102 of a head pair 146 carried by the actuator arm assembly 122. If the Z-height change of an actuator arm 122a,b,c relative to the top disc surface is $\Delta d$, the Z-height change of an adjacent actuator arm 122a,b,c relative to the bottom disc surface is negative $\Delta d$.

A time difference ($\Delta T_z$) of a head pair 146 encountering the servo wedge boundaries between the top surface 132 and the bottom surface 134 due to the Z-height change is expressed in the following relationship:

$$\Delta T_z = 2\Delta t = 2k \times \Delta d$$

Thus, the Z-height change $\Delta d$ is proportional to the time difference change ($\Delta T_z$) of the servo wedge between the top surface and the bottom surface, expressed as follows:

$$\Delta d = \frac{\Delta T_z}{2k}$$

Because of this relationship, for any disc position (defined by radius R), measurements of time can be directly correlated to corresponding changes in Z-height. This relationship is easy to monitor for feedback mechanisms such as feedback circuitry 168 because of a very reliable clock mechanism of the servo clock circuit 322, which is provided in many data storage devices 100 of the described types. Accordingly, no extra hardware, equipment or circuitry is required for implementing the control systems and methods as described. When a data storage device 100 is mechanically completed, in an exemplary embodiment during manufacture, the disc drive undergoes a certification process to optimize drive adaptive parameters, drive capacity, and drive performance. This certification process is also referred to as a Self-Test.

During the certification process, or Self-Test, a sequence of tests are performed to optimize parameters such as Read and Write Adaptive Parameters (RAP), Servo Adaptive Parameters (SAP), and Controller Adaptive Parameters (CAP). RAP includes many sub-files; for example, a Drive Configuration File (capacity, number of heads, number of disc), VBAR (Variable Bit Aspect Ratio) Configuration File (tracks per inch (TPI) and bits per inch (BPI) for each zone); and Channel Parameters File (write current, write current overshoot and duration). SAP is used to store Servo Adaptive Parameters; for example, a Chrome Table (coherent Repeatable Run Out (RRO) table), disk offset, reader-writer gap etc. SAP is defined and maintained by servo engineers. CAP contains information describing the firmware, worldwide name, product family information and other information needed for proper configuration of customer firmware. The contents of this file are controlled by firmware engineers.

During this certification process, a target Z-height of an actuator arm assembly 122 carrying a head pair 146 relative to the top and bottom disc surfaces is determined. The target Z-height is correlated to the time change at which the head pair encounters top and bottom surface servo wedge boundaries, as explained above. This time change between the top and bottom servo wedges, encountered by the head pair during the certification process, is designated $\Delta T_C$. This target $\Delta T_C$ information is stored in the controller 154 or another suitable memory location.

Later, during operation of the disc drive for a read/write interaction, the servo clock circuit 322 measures the time difference change of the servo wedge between the top surface and the bottom surface encountered by the operating head pair 146. This time change difference is designated $\Delta T$.

The time difference change due to the head pair's current Z-height compared to the target Z-height at certification can be expressed by the following relationship:

$$\Delta T_z = \Delta T - \Delta T_C$$

$\Delta T_z$ is used as feedback in the feedback circuitry 168 to correct for the change in Z-height d, in order to move the actuator arm assembly 122 in a vertical z direction. A calculated distance and direction of vertical motion is implement by elevator 140, 158A to eliminate the $\Delta T_z$, so that the $\Delta T = \Delta T_C$. When a time difference $\Delta T$ encountered by a head pair 146 in a read/write operation is the same as the time difference $\Delta T_C$ obtained in certification, then the Z-height of the operating head pair 146 is at its target position. An exemplary elevator incorporates a piezoelectric inchworm brake crawler 158A, as further discussed below.

Figure 5:
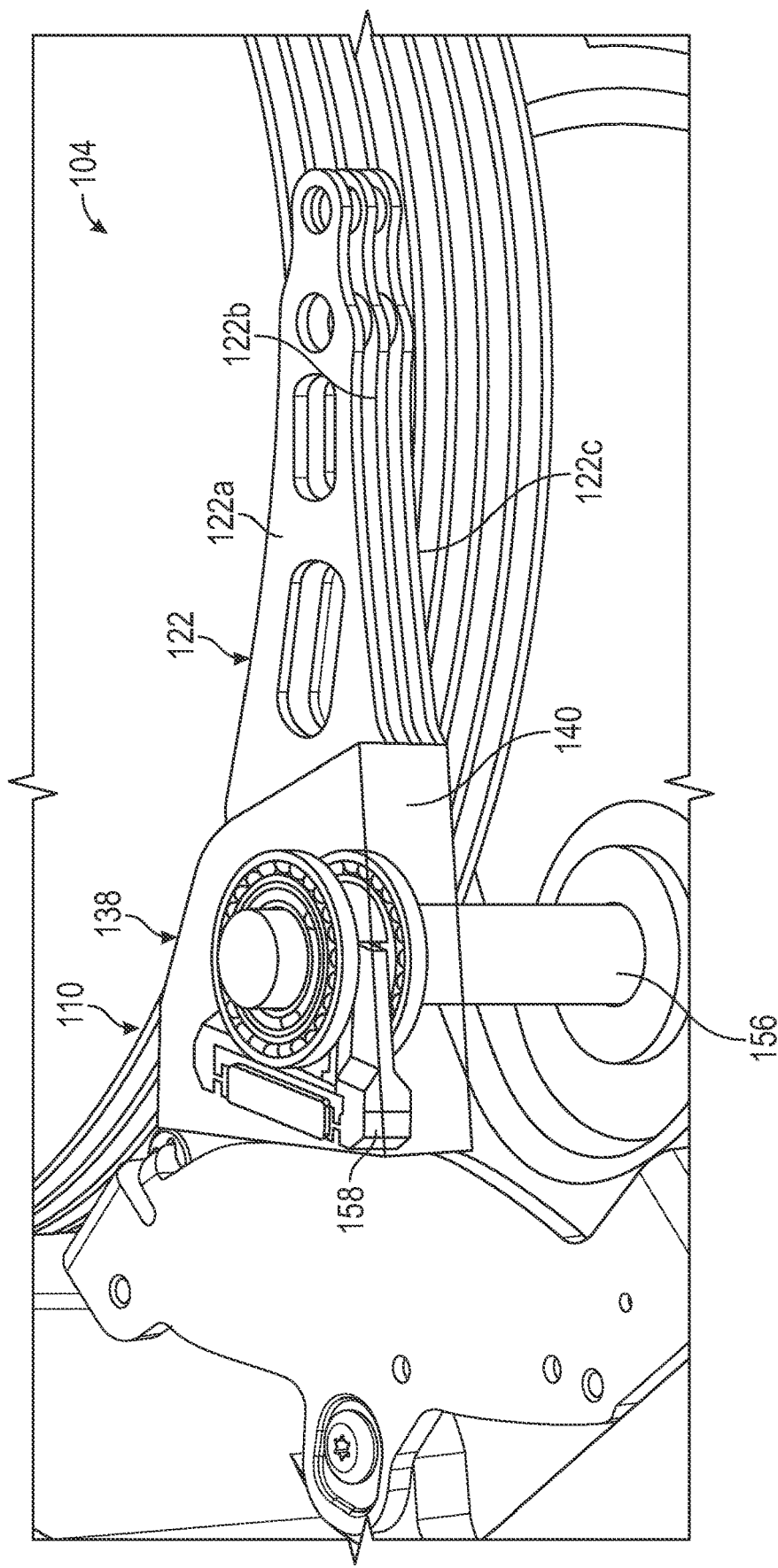
FIG. 5 is a perspective, partially transparent view of a brake assembly incorporated into an elevator of an actuator arm assembly according to one aspect of the disclosure.

FIG. 5 is a perspective, partially transparent view of a brake assembly 158 incorporated into HSA 138 having an elevator 140 according to one aspect of the disclosure. Brake assembly 158 is used to maintain actuator arm assembly 122 in a desired z direction position. In an exemplary embodiment, brake assembly 158 is located within the HSA 138 so that the actuator arm assembly 122 and brake assembly 158 move in unison vertically along guide post 156.

Figure 6:
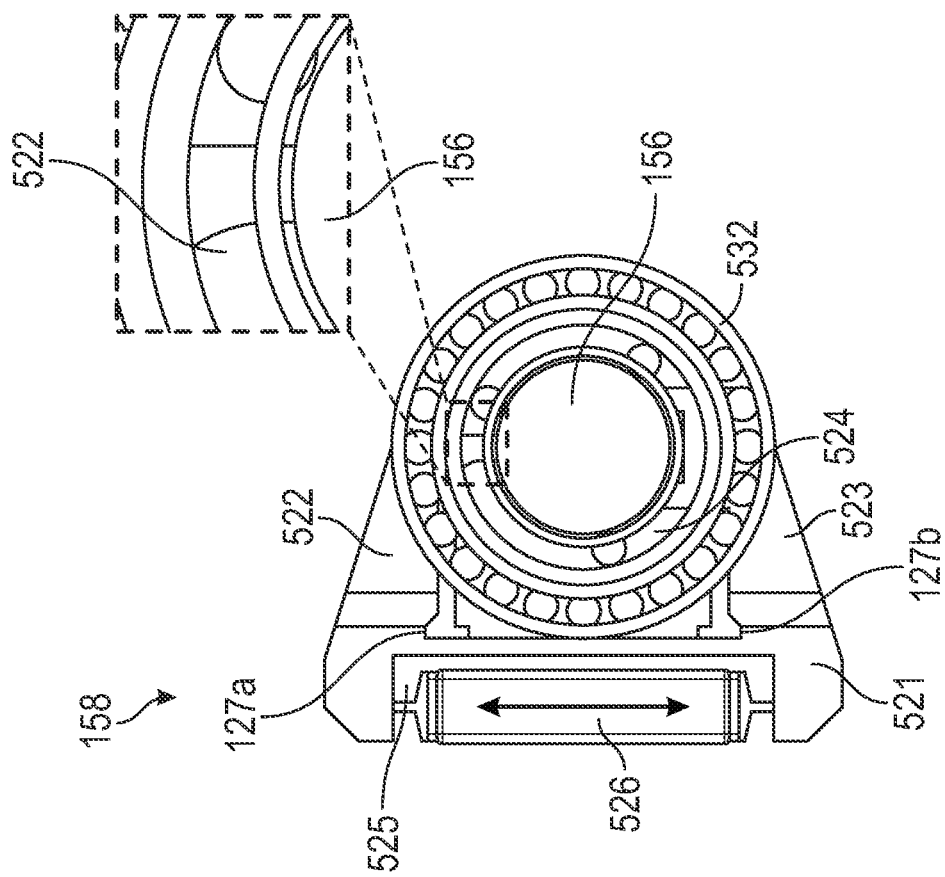
FIG. 6 is a top plane view of the brake assembly of FIG. 5, with the brake deactivated.
Figure 7:
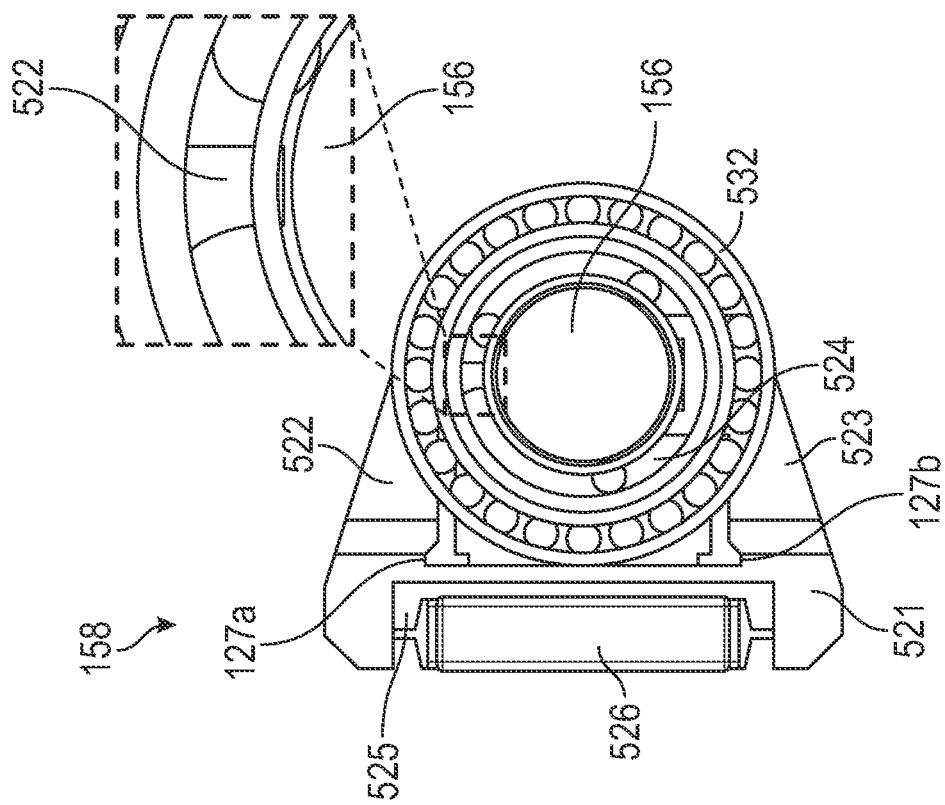
FIG. 7 is a top plane view of the brake assembly of FIG. 5, with the brake activated.

As shown in an exemplary embodiment in FIGS. 6 and 7, the brake assembly 158 generally includes a first clamp arm 522 generally located at one end of a base portion 521, while the second clamp arm 523 is located at the opposite end of the base portion 521. The first clamp arm 522 and the second clamp arm 523 extend from the base portion 521 in the same direction, such that they define an opening 524 between the first and second clamp arms 522, 523. When the brake assembly 158 is mounted on the vertical guide post 156, the vertical guide post 156 resides within in the opening 524.

The base portion 521 includes a recess 525 within which is disposed an actuator element 526 configured to move the arms 522, 523 when activated. Reference herein to an actuator element may include any type of device capable of moving arms 522, 523. For sake of simplicity, the remainder of this Detailed Description will refer to a brake actuator element as a piezoelectric element, which is one type of suitable actuator element that changes in size when activated, such as by voltage application, to thereby move arms 522, 523. However, it should be appreciated that many other types of actuator elements are also suitable, such as magnetic or shape memory alloys or bimetallics. The piezoelectric element 526 may be sized such that it has approximately the same length as the recesses 525 when in a non-activated state (shown in FIG. 6). In this manner, when the piezoelectric element 526 is activated to expand in size, such as expansion in the length direction shown by the arrow in FIG. 7, the piezoelectric element 526 pushes against the base portion 521 at the ends of the recess 525.

The movement of the piezoelectric element 526 against the ends of the recess 525 as described above allows for the terminal ends of the first and second clamp arms 522, 523 to move closer together. In some embodiments, such movement of the terminal ends of the clamp arms 522, 523 in response to the expansion of the piezoelectric elements is based on the clamp arms 522, 523 being connected with the base portion 521 at flex points or hinges 127a, 127b. When the vertical guide post 156 is disposed in the opening 524, this movement together of terminal ends of clamp arms 522, 523 results in a clamping force being exerted against the vertical guide post 156 as shown in FIG. 7. As discussed in greater detail below, this clamping force allows for the brake assembly 158 to lock in place at any z position along the length of the vertical guide post 156.

In FIG. 6, the piezoelectric element 526 is in a non-activated (e.g., non-expanded) state. The piezoelectric element 526 resides against the base portion 521 at the ends of the recess 525 but does not push against the ends of the recess 525. As shown in the inset of FIG. 6, the terminal end of the clamp arm 522 is spaced apart from the vertical guide post 156 so as to not physically contact the vertical guide post 156. The overall dimensions of the clamp arms 522, 523 are designed such that the terminal ends of the first clamp arm 522 and the second clamp arm 523 do not push, contact or reside against the vertical guide post 156 when the vertical guide post 156 is disposed in the opening 524 and the piezoelectric element 526 is not activated. The clamp arms 522, 523 are connected to the base portion 521 via flex points 127a, 127b. The clamp arms 522, 523 are capable of bending/pivoting at the flex points 127a, 127b without breaking off from the base portion 521. The flex points 127a, 127b may be designed such that when no force is applied to the clamp arms 522, 523, they remain in the state shown in FIG. 6, for example, not touching or pushing against vertical guide post 156. The flex points 127a, 127b can therefore be considered to be biased towards the state shown in FIG. 6.

FIG. 7 illustrates how the clamp arms 522, 523 move when piezoelectric element 526 is activated and expands. More specifically, when the piezoelectric element 526 expands, it pushes against the base portion 521 at the ends of the recess 525. This outward movement of the base portion 521 causes the arms 522, 523 to effectively pivot inwardly at the flex points 127a, 127b, such that the terminal ends of the arms 522, 523 come closer together and push against the vertical guide post 156 as shown in the inset of FIG. 7. So long as the piezoelectric element 526 is activated, the arms 522, 523 remain pivoted inwardly and continue to exert clamping force on the vertical guide post 156. When the brake assembly 158 is stationary, this clamping force allows the brake assembly 158 to maintain an associated actuator arm 122 at a desired z position along vertical guide post 156. When the piezoelectric element 526 is deactivated, causing it to reduce in size and no longer push outwardly on the base portion 521, the bias of the flex points 127a, 127b results in the arms reverting back to the position shown in FIG. 6, thereby removing the clamping force from the vertical guide post 156. Thus, the brake assembly 158, which is fixed to actuator arm 122, is free to move up and down the vertical guide post 156 as the elevator 140 moves the actuator arm 122 in the z direction.

FIGS. 5-7 generally illustrate an embodiment in which one piezoelectric element per pair of clamp arms is used. However, it should be appreciated that more than one piezoelectric element per pair of clamp arms can also be used in order to increase the range and type of clamp possible. Furthermore, when multiple piezoelectric elements are incorporated into a pair of clamp arms, the multiple piezoelectric elements may be identical in terms of their rate and type of expansion, or may be different types of piezoelectric elements such that each piezoelectric element provides a different type or degree of movement.

Figure 8A:
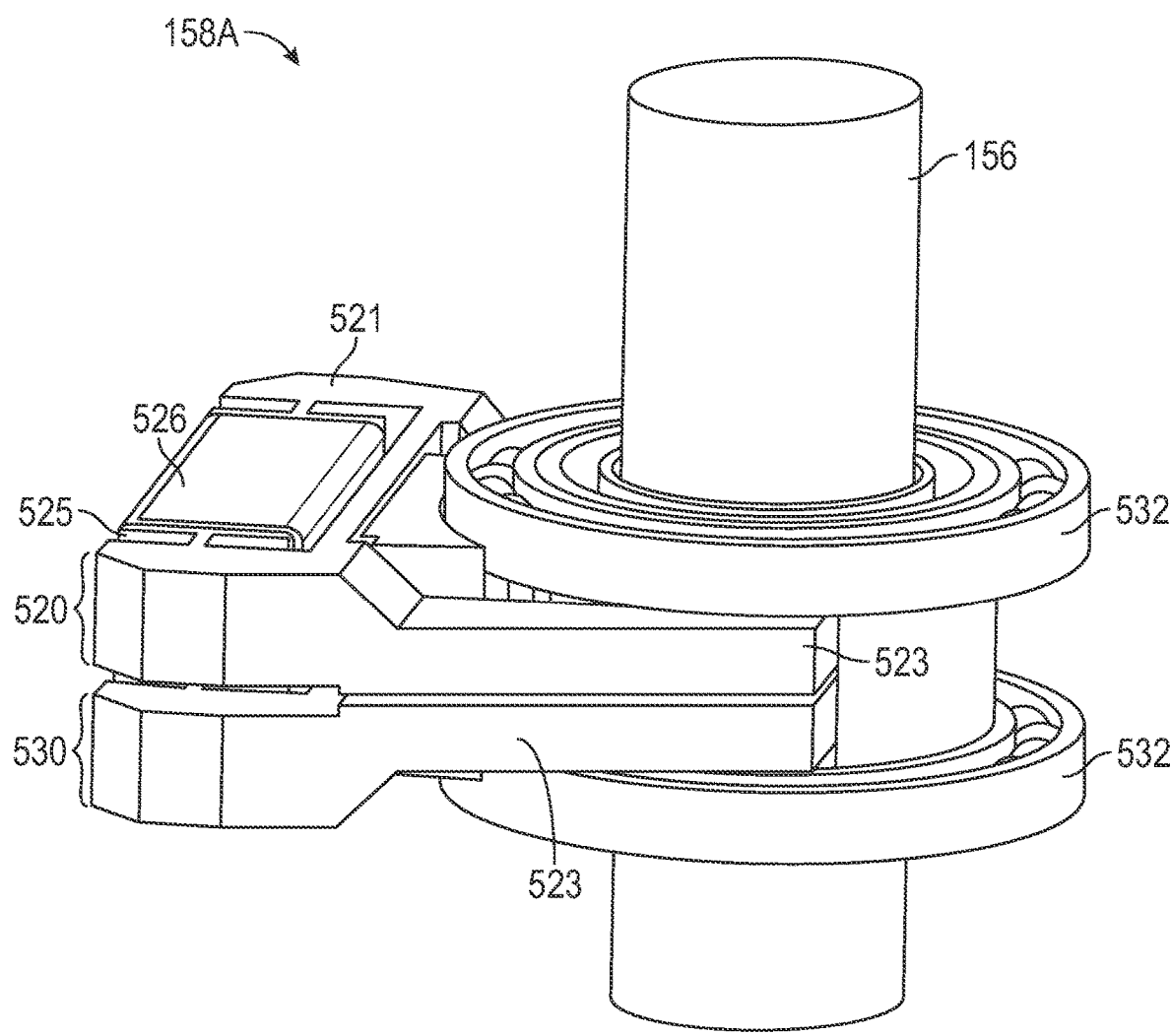
FIG. 8A is a perspective view of a brake crawler according to one aspect of the present disclosure.

As shown in FIGS. 5-7, brake assembly 158 can be used with any elevator mechanism that moves an actuator arm up and down a shaft. In some embodiments, the brake assembly 158 is part of a crawler 158A that itself acts as an elevator. FIG. 8A is a perspective view of a brake crawler 158A according to one aspect of the present disclosure. Although particular shapes of some elements look different in different embodiments (such as guide post 156 clamp arms or sets 520, 522, 523, 530, or elevator 140, for example), it is to be understood that like reference numbers refer to like or analogous structures, and descriptions are applicable to all associated structures, even if there are differences in shape and design.

Brake crawler 158A may be used to move the actuator arm assembly 122 up and down the shaft 156 in a precise manner such that each readable media disc in a stack of readable media can be accurately accessed by the arm assembly 122 and read/write head 102 disposed at the terminal end of the arm assembly 122. The brake crawler 158A described herein is also capable of locking or braking the arm assembly 122 in place along the shaft 156 using the same mechanisms as are used for movement of the arm assembly 122 in the Z-axis, thereby providing a simplified design with fewer parts. While the detailed description of various embodiments of the brake crawler 158A provided below focuses primarily on movement of an arm assembly 122 within a hard disc drive 100, it should be appreciated that the brake crawler 158A can also be used for moving any other component of the hard disc drive that moves along an axis, and may also be used in connection with devices other than hard disc drives. Moreover, brake assemblies of other forms can be used with elevator 140.

Brake crawler 158A of FIG. 8 can be used in place of elevator 140 and brake assembly 158 of FIG. 5 to provide z direction motion as well as braking functions. The brake crawler 158A generally includes a first set of clamp arms 520 and a second set of clamp arms 530, the second set of clamp arms 530 being disposed under or below the first set of clamp arms 520. Each of the sets 520, 530 generally includes components as described above with reference to brake assembly 158. The clamp sets 520, 530 are movable on guide post 156 between or along cylindrical slider 128s 532 or posts that include bearings.

With two clamps sets 520, 530, an inch-worm type of movement of the brake crawler 158A is provided up or down the shaft 156. Regardless of the specific manner in which the clamp arms move (e.g., via flex points or via spring attachments), various combinations of piezoelectric elements can be used in the brake crawler 158A to achieve different effects. In some embodiments, the piezoelectric elements in the first and second set of clamp arms are similar or identical with respect to their rate of expansion when activated such that both sets of clamp arms 520, 530 exert similar or identical clamping forces on the shaft 156. In other embodiments, one of the two piezoelectric elements 526 is designed to expand more than the other, such that the clamp arms associated with the piezoelectric element that expands more exerts more force on the shaft 156 when the piezoelectric element is activated than the other clamp arms. Such a configuration may be useful where one set of clamp arms is desired to be the primary braking/locking mechanism when it is desired to hold the associated arm assembly in place along the length of the shaft 156. In such configurations, the other set of clamp arms may serve only a supplemental or secondary braking/locking function, or may not be used for braking/locking at all. However, regardless of the difference in clamping force exerted based on the different piezoelectric elements used, both sets of clamping arms should be designed to apply some clamping force against the shaft in order to carry out the inch-worm movement of the brake crawler 158A up and down the shaft 156.

Figure 8B:
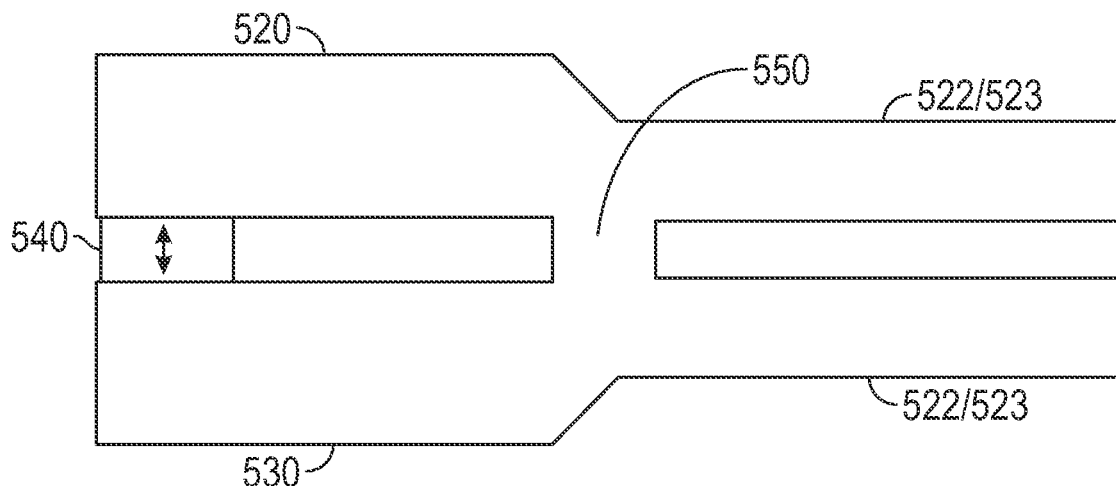
FIGS. 8B and 8C present side views of the brake crawler of FIG. 8A.

As shown in FIG. 8B, which is a simplified side view of the brake crawler 158A, the first set of clamp arms 520 and the second set of clamp arms 530 are aligned essentially parallel to one another such that the terminal ends of the clamp arms 522, 523 are close together. This orientation is achieved when the third piezoelectric element 540 is activated and has expanded in at least the vertical direction to cause the first set of clamp arms 520 and the second set of clamp arms 530 to flex at pivot point 550 towards each other at the terminal ends of the clamp arms. In this embodiment, the pivot point 550 is biased toward the position shown in FIG. 8C, such that when the third piezoelectric element 540 is deactivated and reduces in size in the vertical direction, the terminal ends of the first set of clamp arms 520 and the second set of clamp arms 530 move away from each other by virtue of the first set of clamp arms 520 and the second set of clamp arms 530 pivoting outwardly at the flex point 550 until the flex point 550 reaches its bias position. In the default position of FIG. 8C, the terminal ends of the clamp arms 522, 523 of each of the first set of clamp arms 520 and the second set of clamp arms 530 are farther away from each other than in FIG. 8B.

Figure 8C:
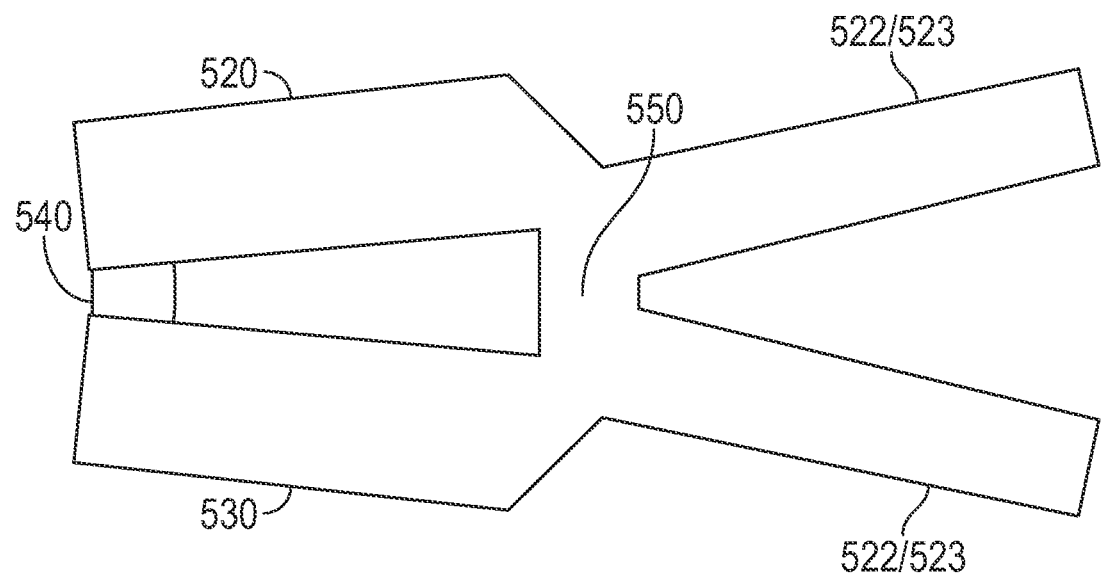

While FIGS. 8B and 8C illustrate using one piezoelectric element 540 for increasing and decreasing the distance between the first set of clamp arms and the second set of clamp arms in the Z-direction at one end of the clamp arms, it should be appreciated that more than one piezoelectric element can be located between the first set of clamp arms and the second set of clamp arms to provide additional functionality. Additionally, the one or more piezoelectric elements located between the first set of clamp arms and the second set of clamp arms may be configured to allow for various separation distances between the first and second set of clamp arms. In some embodiments, the amount of expansion or contraction of the piezoelectric element 540 positioned between the first and second set of clamp arms is controllable to allow for various intermediate spacings between the first and second set of clamp arms, rather than just allowing for full expansion and full contraction, which would only permit for two terminal distances between the first and second set of clamp arms.

The ability of each of the first and second sets of clamp arms 520, 530 of the brake crawler 158A to independently exert and release a clamp force on the shaft 156, and the ability to increase and decrease the distance between the terminal ends of the clamp arms of first set of clamp arms 520 and the second set of clamp arms 530, allow the brake crawler 158A to move up and down the shaft 156 using an inch-worm sequence of movements. When an arm 122 is associated with the brake crawler 158A, this allows for the brake crawler 158A to move the arm 122 up and down the shaft 158A to thereby align with and access any of the vertically stacked readable media discs 104.

Figure 8D:
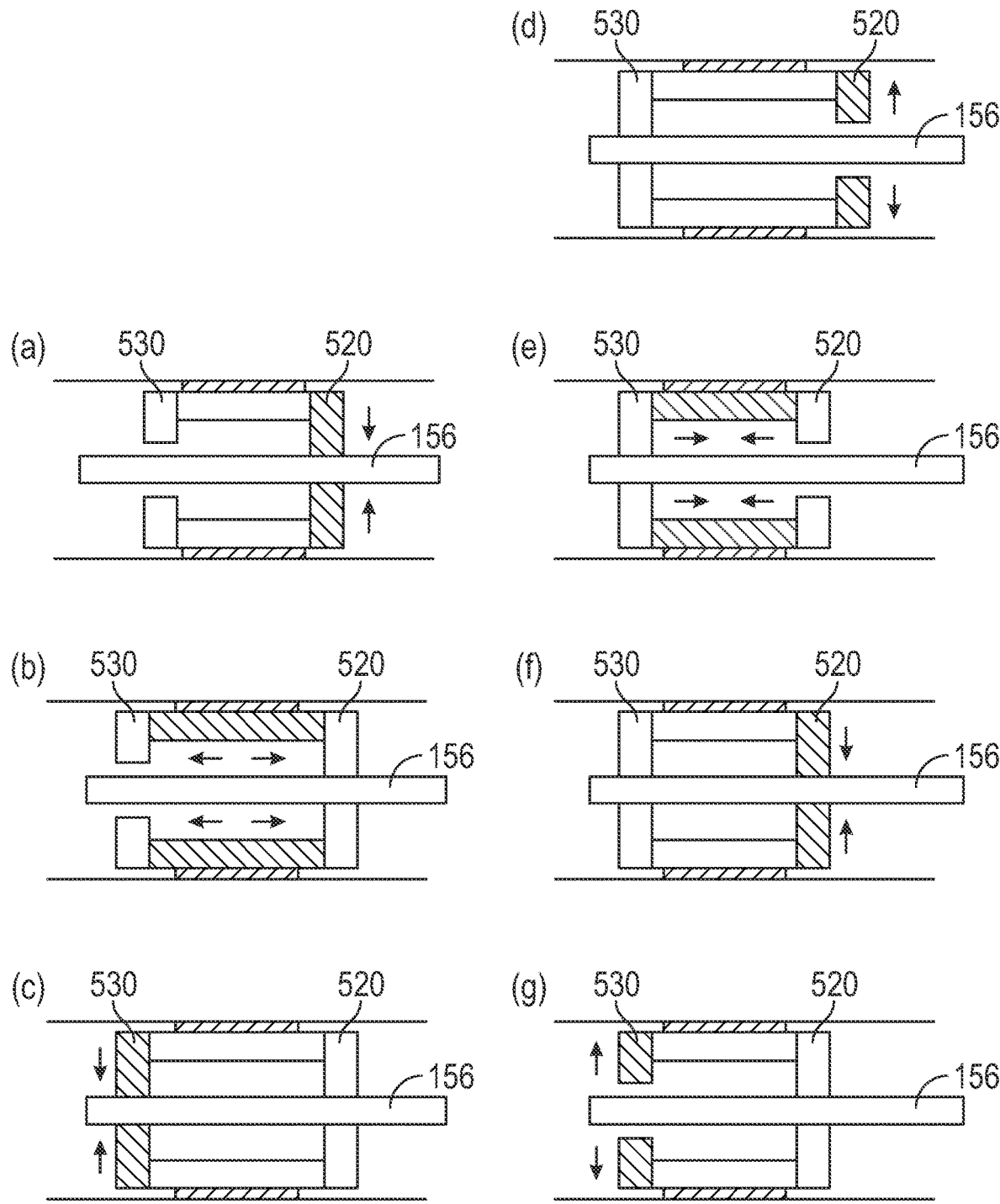
FIG. 8D presents an illustration of a sequence of movements for the brake crawler to perform inch worm movement along a shaft according to one aspect of the present disclosure.

FIG. 8D illustrates the sequence of movements that can be carried out to perform this inch worm type movement of the brake crawler 158A. In this figure, the components are not drawn to scale, and the z direction is illustrated as horizontal, with the "up" direction to the right. At (a), the brake crawler is oriented such that the first set of clamp arms 520 is engaged with and exerting a force against the shaft 156, while the second set of clamp arms 530 is disengaged from the shaft 156. In some embodiments, this may be accomplished by activating the piezoelectric element 526 in the recess of the base of the first set of clamp arms 520 and deactivating the piezoelectric element 526 in the recess of the base of the second set of clamp arms 530. At (a), a piezoelectric element 540 (labeled in FIGS. 8B and 8C) located between the first set of clamp arms 520 and the second set of clamp arms 530 is in whichever state causes the terminal ends of the clamp arms to be closest together (such as activated when using the configuration shown in FIGS. 5-8C).

At (b), the state of the piezoelectric element 540 located between the first set of clamp arms 520 and the second set of clamp arms 530 is changed from its state in (a) so that the terminal ends of each of set of the clamp arms move away from each other, as shown in FIG. 8C. The first set of clamp arms 520 remain engaged with the shaft 110 and the second set of clamp arms 530 remain disengaged with the shaft 110 during (b). At (c), the state of the piezoelectric element 526 associated with the second set of clamp arms 530 is changed from its state in (a) so that the clamp arms of the second set of clamp arms 530 engage with and exert a force against the shaft 156. The first set of clamp arms 520 remain engaged with the shaft 156 and the first set of clamp arms 520 remain distanced away from the second set of clamp arms 530 during (c). At (d), the piezoelectric element 526 associated with the first set of clamp arms 520 is changed such that the first set of clamp arms 520 disengage from the shaft 156. The second set of clamp arms 530 remain engaged with the shaft 156 and the first set of clamp arms 520 remain distanced away from the second set of clamp arms 530 during (d). At (e), the piezoelectric element 540 located between the first set of clamp arms 520 and the second set of clamp arms 530 is changed so that the first set of clamp arms 520 moves closer to the second set of clamp arms 530. The first set of clamp arms 520 remain disengaged with the shaft 156 and the second set of clamp arms 530 remain engaged with the shaft 156 during (e).

At (f), the piezoelectric element 526 associated with the first set of clamp arms 520 is changed so that the first set of clamp arms 520 exert a force against the shaft 156. The second set of clamp arms 530 remain engaged with the shaft 156 and the first set of clamp arms 520 and the second set of clamp arms 530 remain close together during (f). At this point in the sequence of movements, the brake crawler 158A has now moved down the shaft 156 (to the left as illustrated), as the first set of clamp arms 520 are now engaged with the shaft 156 at a lower position on the shaft than as shown in (a). At (g), the piezoelectric element associated with the second set of clamp arms 530 is changed to release the second set of clamp arms 530 from the shaft, and the configuration of the brake crawler has reverted back to the configuration of (a), such that the sequence of movements (a)-(f) can be repeated to continue to move the brake crawler 158A down the shaft 156.

The sequence of movements described above with respect to FIG. 8D can be reversed in order to move the brake crawler 158A up the shaft 156. Additionally, the incremental movement of the brake crawler 158A either up or down the shaft 156 via this sequence of motion allows for precise placement and location of the brake crawler 158A along the shaft 156, which allows for accurate alignment of the brake crawler 158A and associated arms 122a,b,c with the desired readable media disc 104 in the vertical stack.

Figure 9:
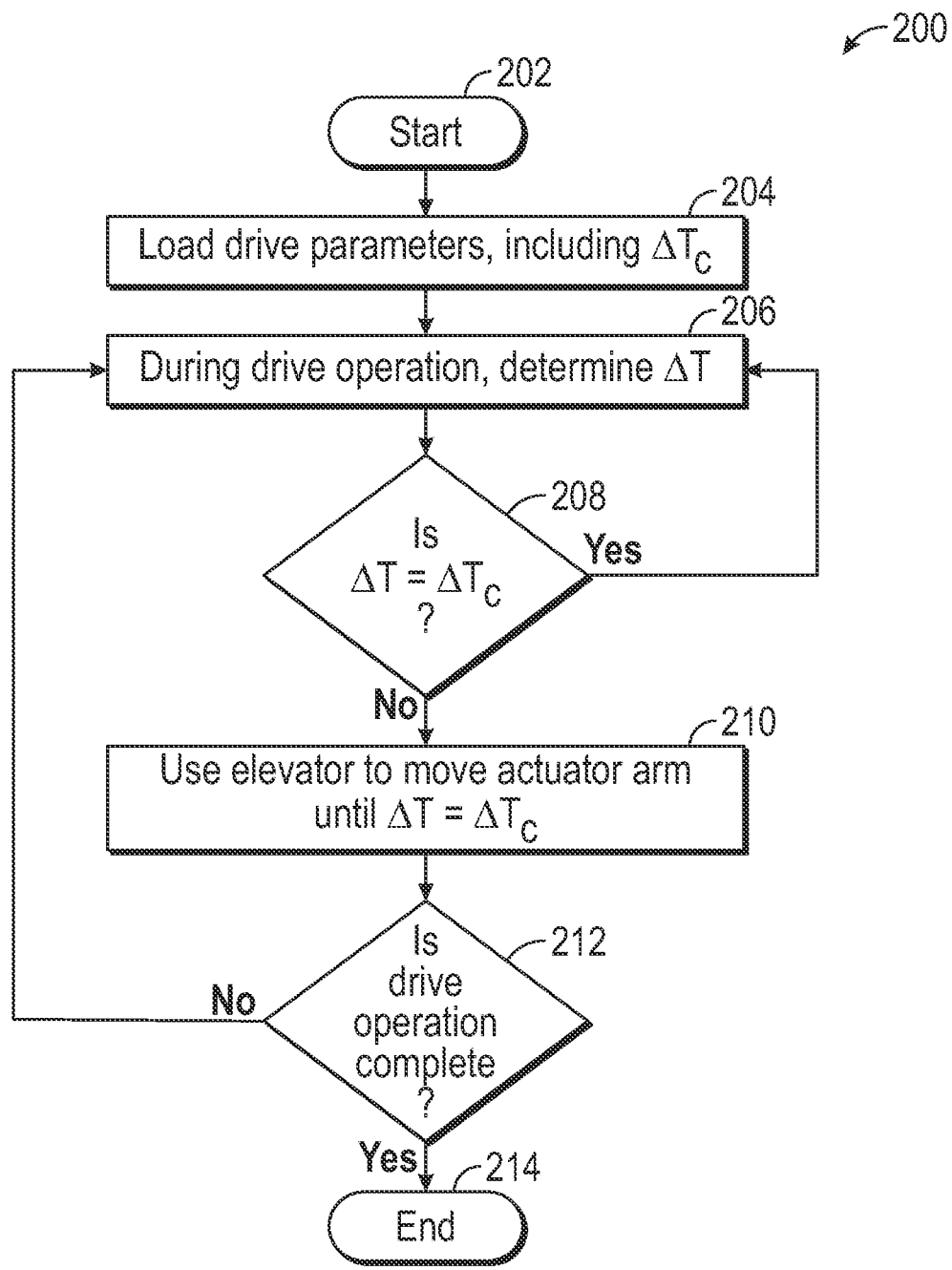
FIG. 9 is a flowchart of an exemplary method for using the described devices and systems.

FIG. 9 is a simplified flow diagram of a method 200 of using a system in accordance with exemplary embodiments. The method may be carried out in devices of the type described above in connection with FIGS. 1-8D. The method starts at 202 and proceeds to 204. During the drive certification process during manufacture of the disk drive, a target Z-height of a head pair 146 relative to the top and bottom disc surfaces is determined. This target Z-height d for each of the top and bottom surfaces correlates to a time difference at which the head pair 146 encounters top and bottom servo wedge boundaries 132, 134. This certification time difference is designated $\Delta T_C$. This $\Delta T_C$ is stored as drive system data with other drive parameters; such storage can be located in a drive system zone or non-volatile (NAND) flash memory, for example. When drive operation starts, the $\Delta T_C$ is retrieved from memory.

At 206, during use of the drive to perform a seek operation for read and write interactions, a precise servo clock of the servo clock circuit 322 determines the time difference when the head pair 146 encounters top and bottom servo wedge boundaries 132, 134, at the same revolution speed of the disc 104 as used during drive certification in 204. This time difference in operation is designated $\Delta T$.

At 208, a query asks whether the time difference of the servo wedge between the top surface and the bottom surface of the disc during operation is equal to the time difference of the servo wedge between the top and bottom surfaces during certification. If "yes," the method returns to 206, in which drive operation continues. Such continued drive operation can also include moving the head pair 146 between different tracks 114. The method can perform query 208 continuously, at designated time intervals during operation, at times when the head pair location is changed relative to the disc surface, or at other intervals or events. If the answer to query 208 is "no," then the method proceeds to 210, wherein an elevator 140, 158A is used to move the actuator arm assembly 122 until $\Delta T = \Delta T_C$. Query 212 asks if operation of the data storage device is complete. If "no," drive operation continues at 206. If the answer to query 212 is "yes," then the method ends at 214.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
a data storage disc comprising:
a top surface and a bottom surface, each of the top and bottom surfaces being parallel to an x-y plane; and
a servo wedge comprising a top surface boundary of the servo wedge and a bottom surface boundary of the servo wedge;
an actuator arm assembly supporting a head pair configured for interaction with the top and bottom surfaces;
a servo clock configured to determine a top time at which the head pair encounters the top surface boundary of the servo wedge and a bottom time at which the head pair encounters the bottom surface boundary of the servo wedge during a disc read/write interaction; and
a feedback and control system configured to:
determine an operation time difference between the top and bottom times;

compare the operation time difference to a certification time difference correlating to a target vertical position of the actuator arm assembly relative to the disc; and move the actuator arm assembly to the target vertical position based on a comparison of the operation time difference and the certification time difference.

2. The data storage device of claim 1 wherein the actuator arm assembly comprises:
a first actuator arm attached to a first suspension; and
a second actuator arm attached to a second suspension.

3. The data storage device of claim 2 wherein the head pair comprises:
a first head attached to the first suspension; and
a second head attached to the second suspension.

4. The data storage device of claim 1 comprising an elevator configured to move the actuator arm assembly in a z direction perpendicular to the x-y plane.

5. A data storage device comprising:
a data storage disc comprising:
  a data track;
  a top surface and a bottom surface, each of the top and bottom surfaces being parallel to an x-y plane; and
  a servo wedge comprising:
    a top surface boundary of the servo wedge; and
    a bottom surface boundary of the servo wedge;
    wherein the top surface boundary and the bottom surface boundary are spaced apart by a distance along the data track;
an actuator arm assembly comprising:
  a first actuator arm supporting a first head configured for interaction with the top surface, the first actuator arm spaced at a Z-height from the top surface;
  a second actuator arm supporting a second head configured for interaction with the bottom surface; and
a feedback and control system configured to:
  employ a transfer function relating the Z-height to the distance; and
  change the Z-height based on the transfer function.

6. The data storage device of claim 5, wherein the feedback and control system comprises a servo clock configured to determine a top time at which the first head encounters the top surface boundary of the servo wedge and a bottom time at which the second head encounters the bottom surface boundary of the servo wedge during a disc read/write interaction.

7. The data storage device of claim 5 comprising an elevator configured to move the actuator arm assembly in a z direction perpendicular to the x-y plane.

8. A method comprising:
writing a servo wedge onto a data storage disc having a top surface and a bottom surface, each of the top and bottom surfaces being parallel to an x-y plane;
  the writing resulting in a top surface boundary of the servo wedge and a bottom surface boundary of the servo wedge;
during a disc certification event:
  supporting a head pair on an actuator arm assembly while the disc rotates at a spin speed measurable in revolutions per minute (rpm);
  flying the head pair at a data track located at radius R from a disc center, wherein the head pair encounters the top surface boundary of the servo wedge at a first time and wherein the head pair encounters the bottom surface boundary of the servo wedge at a second time, thereby defining a certification time difference ($\Delta T_c$) between the first and second times; and determining a target Z-height ($d_1$) between a first actuator arm of the actuator arm assembly and the top surface at the data track;
during a disc read/write interaction:
  flying the head pair at the data track while the disc rotates at the spin speed, wherein the head pair encounters the top surface boundary of the servo wedge at a third time, and wherein the head pair encounters the bottom surface boundary of the servo wedge at a fourth time, thereby defining an operation time difference ($\Delta T$) between the third and fourth times;
  determining an amount ($\Delta T_Z$) by which the operation time difference ($\Delta T$) is changed from the certification time difference ($\Delta T_c$); and
  employing $\Delta T_Z$ to move the first actuator arm toward the target Z-height ($d_1$).

9. The method of claim 8 comprising measuring the first, second, third and fourth times with a servo clock.

10. The method of claim 8 comprising actuating an elevator to move the actuator arm assembly in a z direction, perpendicular to the x-y plane.

11. The method of claim 8 comprising rotating the actuator arm assembly about a pivot axis to place the head pair at the data track, wherein a head direction is positioned at a skew angle $\alpha$ to a tangent of the data track.

12. The method of claim 11 comprising:
supporting a first head of the head pair on a first suspension connected to the first actuator arm of the actuator arm assembly, the first suspension having a length S; and
supporting a second head of the head pair on a second suspension connected to a second actuator arm of the actuator arm assembly.

13. The method of claim 12 comprising:
encountering the top surface boundary of the servo wedge with the first head; and
encountering the bottom surface boundary of the servo wedge with the second head.

14. The method of claim 13 wherein during the flying of the head pair at the data track during the disc read/write interaction:
the first actuator arm is located at an operation Z-height ($d_2$) from the top surface; and
the first suspension is disposed at an angle theta ($\theta$) relative to the x-y plane.

15. The method of claim 14 wherein:
a difference $\Delta d$ between the target Z-height ($d_1$) and the operation Z-height ($d_2$) is denoted as $\Delta d = d_1 - d_2$; and
an on-track displacement $\Delta x$ due to the difference $\Delta d$ satisfies the following expressions:

$$\Delta x = \frac{\Delta d \sin(\theta)}{\cos(\theta)} - \frac{\Delta d^2}{2S\cos^2(\theta)}$$

$$\Delta x \cong \frac{\Delta d \sin(\theta)}{\cos(\theta)}.$$

16. The method of claim 15 wherein a time change ($\Delta t$) due to difference $\Delta d$ is defined by the following:

$$\Delta t = \frac{\Delta x \cos(\alpha)}{2\pi R} \times \frac{60}{rpm} = \Delta d \left( \frac{\sin(\theta)}{\cos(\theta)} \times \frac{\cos(\alpha)}{2\pi R} \times \frac{60}{rpm} \right) = k \times \Delta d.$$

17. The method of claim 16 wherein the amount ($\Delta T_Z$) is expressed in the following relationship:

$\Delta T_Z = 2\Delta t = 2k \times d.$

18. The method of claim 16 wherein the amount ($\Delta T_Z$) is expressed in the following relationship:

$\Delta T_Z = \Delta T - \Delta T_C.$

19. The method of claim 8 wherein determining the amount ($\Delta T_Z$) is repeated at a set time interval.

20. The method of claim 8 wherein determining the amount ($\Delta T_Z$) is repeated when the head pair is moved to a second data track.

* * * * *